(12) United States Patent
Kowalski et al.

(10) Patent No.: US 7,746,766 B2
(45) Date of Patent: Jun. 29, 2010

(54) SYSTEMS AND METHODS FOR OBTAINING AN OPTIMUM TRANSMISSION FORMAT OF REFERENCE SIGNALS TO MAXIMIZE CAPACITY AND MINIMIZE PEAK TO AVERAGE POWER RATIO

(75) Inventors: John M. Kowalski, Camas, WA (US); Huaming Wu, Vancouver, WA (US); Lizhong Zheng, Canton, MA (US)

(73) Assignee: Sharp Laboratories of America, Inc., Camas, WA (US)

( * ) Notice: Subject to any disclaimer, the term of this patent is extended or adjusted under 35 U.S.C. 154(b) by 882 days.

(21) Appl. No.: 11/534,197

(22) Filed: Sep. 21, 2006

(65) Prior Publication Data

US 2008/0075188 A1 Mar. 27, 2008

(51) Int. Cl.
*H04J 11/00* (2006.01)
(52) U.S. Cl. .................. 370/208; 370/252; 375/260
(58) Field of Classification Search .......... 370/203, 370/207, 208, 210, 252, 253; 375/260, 265, 375/267
See application file for complete search history.

(56) References Cited

U.S. PATENT DOCUMENTS

| | | | |
|---|---|---|---|
| 7,535,967 B2 * | 5/2009 | Krauss et al. | 375/260 |
| 2002/0191534 A1 * | 12/2002 | Silvers et al. | 370/206 |
| 2005/0185728 A1 * | 8/2005 | Wallace et al. | 375/267 |
| 2006/0115030 A1 * | 6/2006 | Erving et al. | 375/348 |
| 2006/0158376 A1 | 7/2006 | Kaneko | |
| 2006/0159188 A1 | 7/2006 | Izumi | |
| 2006/0160545 A1 | 7/2006 | Goren et al. | |
| 2006/0256888 A1 * | 11/2006 | Nissani (Nissensohn) | 375/267 |
| 2007/0149181 A1 * | 6/2007 | Lin et al. | 455/415 |

OTHER PUBLICATIONS

"Superimposed Training on Redundant Precoding for Low-Complexity Recovery of Block Transmissions," Ohno et al., Proc. IEEE International Conf. Commun., vol. 5, Helsinki, Finland, Jun. 2001, pp. 1501-1505.
"Optimal Peak-to-Average Power Ratio Reduction in MIMO-OFDM Systems," Aggarwal et. al., ICC 2006.
"Channel Estimation with Superimposed Pilot Sequence," Hoeher et al., Proc. IEEE GlobeCom, 1999. pp. 2162-2166.
"Superimposed training for doubly selective channels," Zhou et al., Proc. IEEE Statistical Signal Processing Workshop, St. Louis, MO, Sep. 2003, pp. 82-85.

* cited by examiner

*Primary Examiner*—Ricky Ngo
*Assistant Examiner*—Kan Yuen
(74) *Attorney, Agent, or Firm*—Austin Rapp & Hardman

(57) ABSTRACT

A method for optimizing a transmission format of a reference signal is disclosed. A first matrix is provided. A second matrix is computed from the first matrix. A derivative of a function of the second matrix is defined. Iterates of the function are obtained. A function of the second matrix is determined. An optimum value of the first matrix is calculated.

15 Claims, 17 Drawing Sheets

SYSTEMS AND METHODS FOR OBTAINING AN OPTIMUM TRANSMISSION FORMAT OF REFERENCE SIGNALS TO MAXIMIZE CAPACITY AND MINIMIZE PEAK TO AVERAGE POWER RATIO

TECHNICAL FIELD

The present invention relates generally to communication systems and communication systems-related technology. More specifically, the present invention relates to obtaining an optimum transmission format of reference signals to maximize capacity and minimize peak to average power ratio.

BACKGROUND

A wireless communication system typically includes a base station in wireless communication with a plurality of user devices (which may also be referred to as mobile stations, subscriber units, access terminals, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multitone transmission (DMT).

The 3rd Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

The proposed OFDM-based modulation schemes, both on the uplink and the downlink, would require a relatively high peak to average power ratio (PAPR). This is because the amplitude of an OFDM signal is the summation of the amplitudes of the respective sub-carriers. As a result, the amplitude of an OFDM signal may change quite significantly. When a modulated signal with a high PAPR passes through an RF processing unit, the signal may be distorted due to the non-linearity of a regular RF amplifier.

Reducing the PAPR may reduce the distortion of the signal. A high PAPR of OFDM systems introduces inevitable non-linear distortion in the transmitter and reduces the performance dramatically. The high PAPR also demands a very linear transmission and blocks the practical deployment of low-cost low power OFDM systems. As such, benefits may be realized by providing systems and methods to reduce the PAPR in communication systems.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
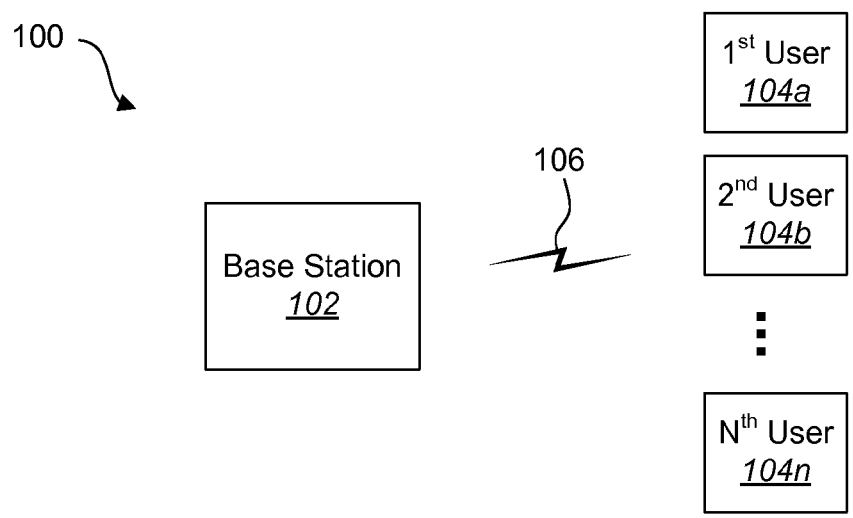
FIG. 1 illustrates an exemplary wireless communication system in which embodiments may be practiced.

A method for optimizing a transmission format of a reference signal is disclosed. A matrix is provided. A compact matrix is computed from the provided matrix. A derivative of a function of the compact matrix is defined. Iterates of the function are obtained. A function of the compact matrix is determined. An optimum value of the provided matrix is calculated.

In one embodiment, a plurality of data symbols are transformed to be sent contemporaneously with one or more reference signals. The plurality of data symbols and the one or more reference signals may be transmitted with a single antenna. The plurality of data symbols and the one or more reference signals may be transmitted with a multiple-input multiple-output antenna system.

In one embodiment, Gaussian random matrices may be implemented to represent signal constellations. Random M-ary phase shift keyed (M-PSK) modulation may be implemented to transmit the data, wherein the data and a superposed pilot signal may be optimized based on the M-PSK modulation format. Random M-ary quadrature amplitude modulation (M-QAM) modulation may be implemented to transmit the data, wherein the data and a superposed pilot signal may be optimized based on the M-QAM modulation format.

In one embodiment, Gram-Schmidt procedures may be implemented to format a signal to be orthogonal to the data wherein the signal may be superposed on the data. The data may be transmitted in the form $$\left[ \sqrt{\frac{\rho_p}{m_T}} X^{(p)} + \sqrt{\frac{\rho_d}{m_T}} A X^{(d)} \right]$$

wherein $X^{(d)}$ is a column vector which is mapped by a matrix A into a column vector of n rows, wherein n represents coherence time of the flat fading channel, wherein m represents the number of antennas, and wherein $X^{(p)}$ is a reference signal composed of the sum of m orthogonal reference signals. The matrix A may have a singular value decomposition of the form $A = U\Sigma V^H$, wherein a matrix $U \in \mathcal{C}^{n \times n}$, wherein $\Sigma \in \mathcal{C} n \times (n-1)$, wherein a matrix $V \in \mathcal{C}(n-1) \times (n-1)$, wherein U and V are unitary matrices, and wherein $\Sigma$ is a matrix of singular values on the diagonal.

In one embodiment, the matrix A may be an isometry wherein $\Sigma$ may have the form of all ones on the diagonal, except for the last row, wherein the last row is zero. The matrix U may be an orthonormal basis which may include $X^{(p)}$ in the last row and column of the matrix U. The optimum provided matrix may be obtained by implementing steepest decent methods restricted to a Stiefel manifold determined by the reference signals.

A communications system that is configured to implement a method for optimizing a transmission format of a reference signal is also disclosed. A processor and memory in electronic communication with the processor are disclosed. A matrix is provided. A compact matrix is computed from the provided matrix. A derivative of a function of the compact matrix is defined. Iterates of the function are obtained. A function of the compact matrix is determined. An optimum value of the provided matrix is calculated.

A method for obtaining an original data constellation from a combined reference and data signal is also disclosed. The combined reference and data signal is received. A buffer is applied to the combined signal. The combined signal is multiplied by a first matrix. The combined signal is multiplied by a second matrix. The product from the first matrix is multiplied with the product from the second matrix. The original data constellation is recovered.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

A number of techniques have been implemented to reduce the peak to average power ratio in OFDM systems. An example technique which may serve to reduce the peak to average power ratio is obtaining an optimum transmission format of reference signals. An optimum transmission format of reference signals may maximize capacity and minimize the PAPR. The present systems and methods relate to the issue of combining a reference signal with the data signal at the transmitter and transmitting the reference signal in an optimum format. The present systems and methods also relate to separating the reference signal from the data signal at the receiver. In one embodiment, a single antenna communication system includes a pilot signal and a multiple antenna communication system includes reference signals.

A transmitter may transmit a vector signal of the form x(t), where at any time $x(t) \in \mathcal{C}m_T$, the Hilbert space of complex m-dimensional vectors, transmitted over a multiple antenna system which is received by a receiver as:

$$y(t) = Hx(t) + w(t) \qquad (1)$$

where H may be an $m_R \times m_T$ complex channel matrix $\in \mathcal{C}m_R \times m_T$, and w may be an $m_R$ dimensional additive white Gaussian noise (AWGN) vector whose elements may be independent and identically distributed (i.i.d.), and whose sample values may include $\in \mathcal{C}m_R$. The channel matrix may result from a block-fading law, where the channel may be constant for some discrete time interval T, after which it may change to an independent value for the next interval of duration T, etc. Data may be sent for $T_d$ discrete time instants as a vector $x^{(d)}(t)$, and in addition data may be sent for $T_p$ time instants as a vector $x^{(p)}(t)$. In one embodiment, $T = T_d + T_p$, and the receiver may be implemented to compute and utilize channel estimates. The vectors $x^{(d)}(t)$ and $x^{(p)}(t)$ may be sent at different powers/energies per unit time. The total energy may be represented as $rT = r_d T_d$. In one embodiment, resources devoted to training may be functions of energy.

When the receiver computes the estimation of the channel, a minimum mean square estimate (MMSE) $\hat{H}$ of H, may be computed. The variance of the estimation error (i.e., trace of covariance matrix from equation (1)) is $$\frac{1}{(\|x^{(p)}(t)\|^2 + 1)},$$

with the variance of the noise normalized to unity. The optimal training energy, as a function of total energy, based on assumptions of additive i.i.d. noise, may be expressed as:

$$E_{opt} = \begin{cases} 1 - (\gamma - \sqrt{\gamma(\gamma - 1)}) & \text{for } T_d > m_T \\ 1/2 & \text{for } T_d = m_T \\ 1 - (\gamma + \sqrt{\gamma(\gamma - 1)}) & \text{for } T_d < m_T \end{cases} \qquad (2)$$

where $$\gamma = \frac{m_T + \rho T}{\rho T \left(1 - \frac{m_T}{T_d}\right)},$$

where ρ is the overall SNR, and so that the energy is given by ρT, and the energy due to a data signal and a pilot signal respectively would be given by $\rho_d T_d$ and $\rho_p T_p$. Further, as shown in equation (3) (provided below), if the transmit power of the training (or pilot signal) and the data are allowed to vary, the optimal training may be as short as possible (with $T_p = m_T$).

Several factors generally prevent the implementation of such systems described above. Typically, the transmitted peak-to-average power ratio (PAPR) may need to be minimized to conserve energy of the transmitter, which is often battery operated. Also, the transmitter may need to meet certain spectral mask requirements imposed by national regulatory bodies. The use of training samples may imply that $m_T$ degrees of freedom are unused to transmit information, but rather to determine the channel characteristics.

One possible way this may be achieved is to send the data and pilot signals together over the period of time T, so that $x(t) = x^{(d)}(t) + x^{(p)}(t)$ for $t \in [kT, (k+1)T)$. This possibility may include imposing the condition that $$\int_{kT}^{(k+1)T} x^{(d)}(t) dt = 0.$$

In a communication system implementing code division multiple access (CDMA) a separate orthogonal CDMA code may be used as the pilot signal. Were this concept extended to multiple-input multiple-output (MIMO) communications, the reference signals may be used with the property $$\int_{kT}^{(k+1)T} x_j^{(d)}(t) x_k^{*(p)}(t) dt = 0, \, j,$$

$k = 1 \ldots m_T$. However, this may imply $m_T$ degrees of freedom may still be allocated to the pilot signal. As such, a representation of $x^{(p)}(t)$ may be defined such that at most $m_T$ time symbols are used which may allow accurate estimation of the channel process at the receiver and may meet peak-to-average power constraints and spectral mask constraints.

FIG. 1 illustrates an exemplary wireless communication system 100 in which embodiments may be practiced. A base station 102 is in wireless communication with a plurality of user devices 104 (which, as indicated above, may also be referred to as mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "OFDM transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
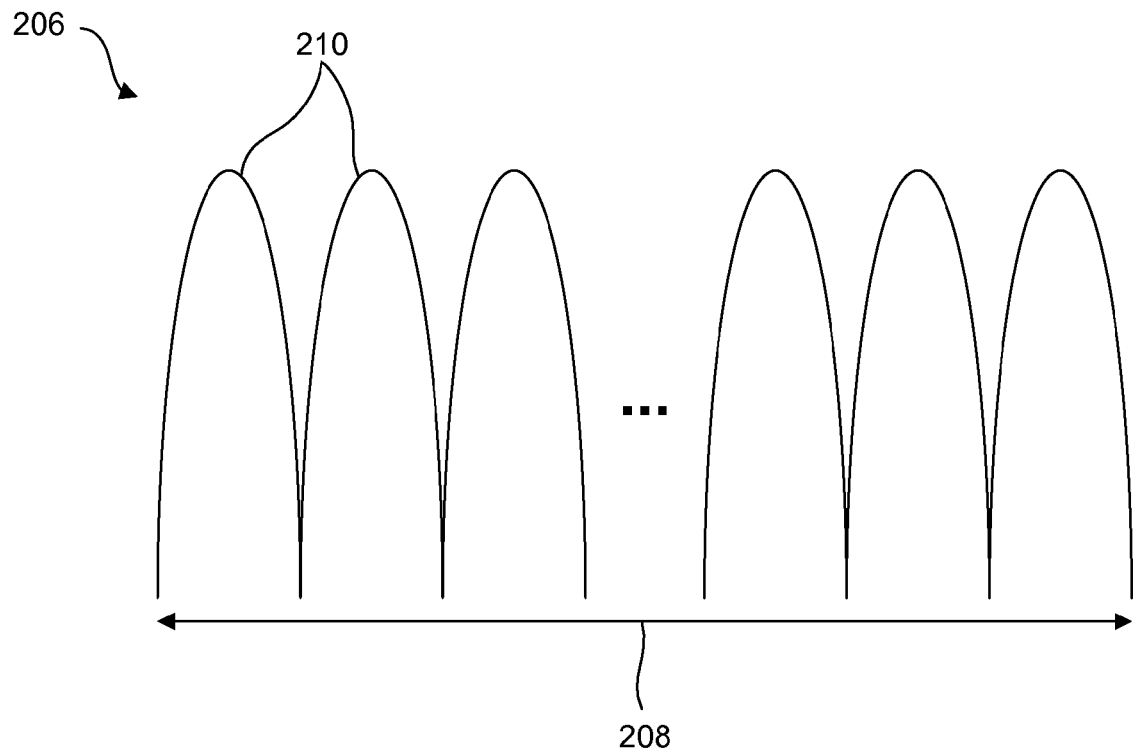
FIG. 2 illustrates some characteristics of a transmission band of an RF communication channel in accordance with an OFDM-based system.

FIG. 2 illustrates some characteristics of a transmission band 208 of an RF communication channel 206 in accordance with an OFDM-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier.

Figure 3:
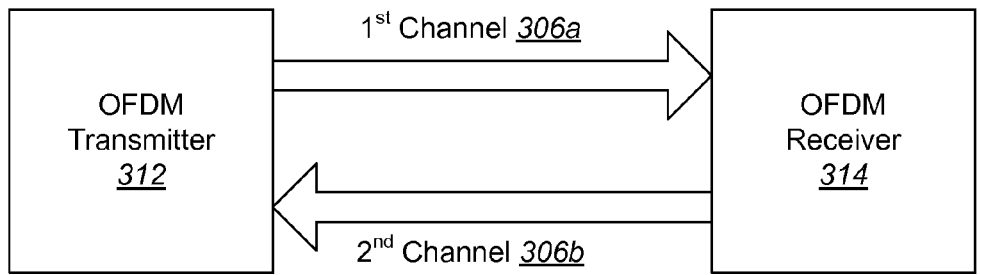
FIG. 3 illustrates communication channels that may exist between an OFDM transmitter and an OFDM receiver according to an embodiment.

FIG. 3 illustrates communication channels 306 that may exist between an OFDM transmitter 312 and an OFDM receiver 314 according to an embodiment. As shown, communication from the OFDM transmitter 312 to the OFDM receiver 314 may occur over a first communication channel 306a. Communication from the OFDM receiver 314 to the OFDM transmitter 312 may occur over a second communication channel 306b.

The first communication channel 306a and the second communication channel 306b may be separate communication channels 306. For example, there may be no overlap between the transmission band of the first communication channel 306a and the transmission band of the second communication channel 306b.

Figure 4A:
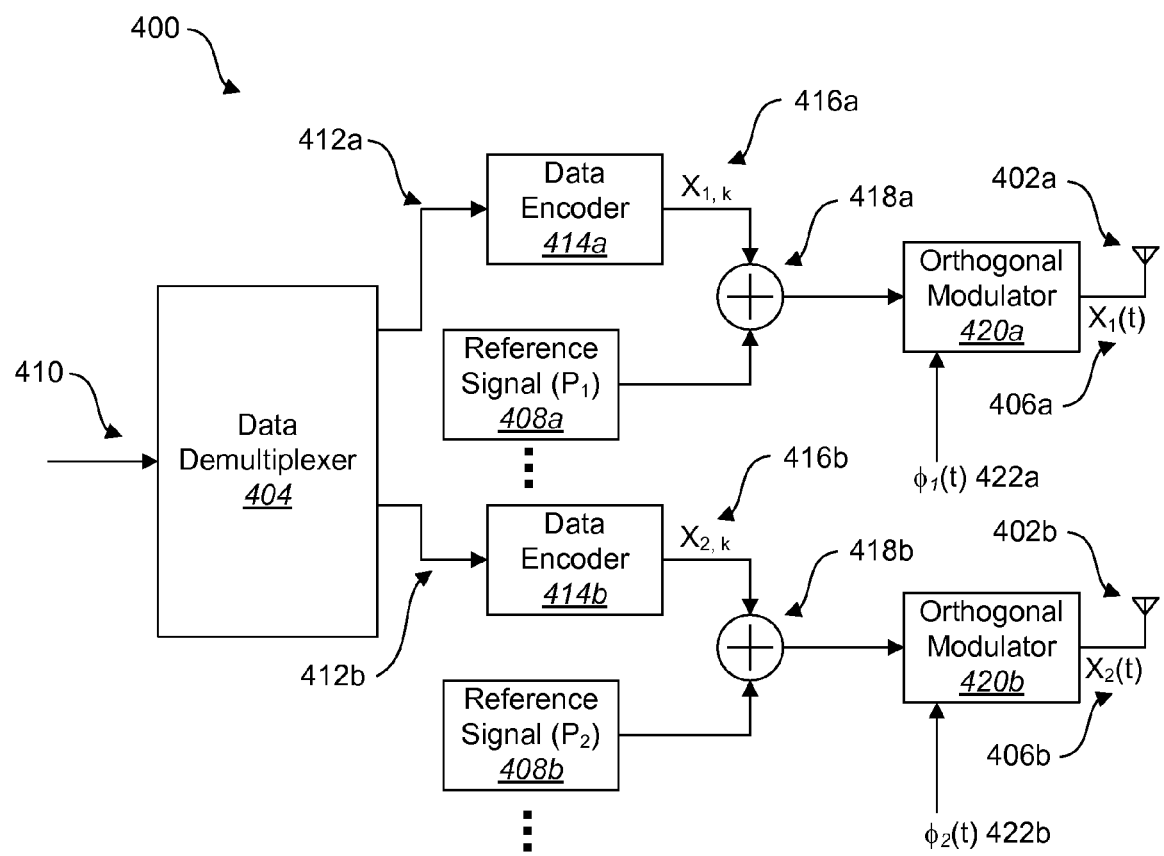
FIG. 4a illustrates a block diagram of one embodiment of a transmitter which may transmit data signals to a receiver.

FIG. 4a is a block diagram illustrating one embodiment of a transmitter 400 in which two antennas 402a and 402b are used to transmit two data signals $x_1(t)$ 406a and $x_2(t)$ 406b simultaneously with two reference signals $P_1$ 408a and $P_2$ 408b using an orthogonal modulation. Some embodiments of the transmitter 400 may include a single antenna. In other embodiments, the transmitter 400 may include multiple antennas.

The transmitter 400 may include a data demultiplexer 404 which serves to receive a single data signal 410 and then split the single data signal 410 into multiple signals 412a, 412b. The multiple signals 412a, 412b may be encoded by data encoders 414a, 414b which serve to change a signal or data into code. The output of each data encoder 414a, 414b may be referred to as $x_{1,k}$ 416a and $x_{2,k}$ 416b. A summation function 418a, 418b may sum the output of the data encoders 414a, 414b with the reference signals 408a, 408b. An orthogonal modulator 420a, 420b may modulate the summed signals with orthogonal functions $\phi_1(t)$ 422a and $\phi_2(t)$ 422b. The transmitter antennas 402a, 402b may transmit the modulated signals to a receiver. A further explanation of super-positioning reference signals onto data signal for multiple antenna transmission from the transmitter 400 is now provided.

In transmitting a signal in a band of interval $$\left[\frac{-W}{2}, \frac{W}{2}\right)$$

in duration of T, WT orthogonal waveforms may be transmitted. Following equation (3) (provided below), with $m_T$ transmit antennas, there is a coherence time of T symbols available, to be allocated amongst pilot and data symbols. If an orthogonal waveform may be transmitted in one of these symbols times (denoted as $T_s$, such that $T=K T_s$, in bandwidth W), then there may be (with $m_T=m_R=m$ antennas) up to mWK orthogonal waveforms that may be transmitted in time T, if the multiple antenna channels truly behave as independent channels.

In one embodiment, the summation function 418 may yield $(P_1+x_{1,k})$ which may be modulated by the orthogonal modulator 420a. $(P_1+x_{1,k})$ may be modulated by the orthogonal function $\phi_1(t)$ 422a, in time $[(k-1)T_s, kT_s)$. In other words $x_1(t)=(P_1+x_{1,k}) \phi_1(t)$, and $$\int_{(k-1)T_s}^{kT_s} \phi_1(t)\phi_2^*(t)dt = 0$$

so that at a receiver, a correlation may be performed with the appropriate orthogonal function $\phi_1(t)$ 422a which may yield an estimate of $(P_1+x_{1,k})$. The estimate of $(P_1+x_{1,k})$ may include additive noise.

An added requirement that $$\int_T \sum_k x_{ik} P(t-\kappa T_s) d\tau = 0$$

may indicate that the number of orthogonal signals transmitted over any given antenna may be two. Further, the number of reference signals transmitted may also be two. In one embodiment, these degrees of freedom may come from the orthogonal modulation. In particular, if an OFDM modulation is implemented, then the reference signal $P_1$ 408a occupies the 0 Hz carrier position of the modulation.

Figure 4B:
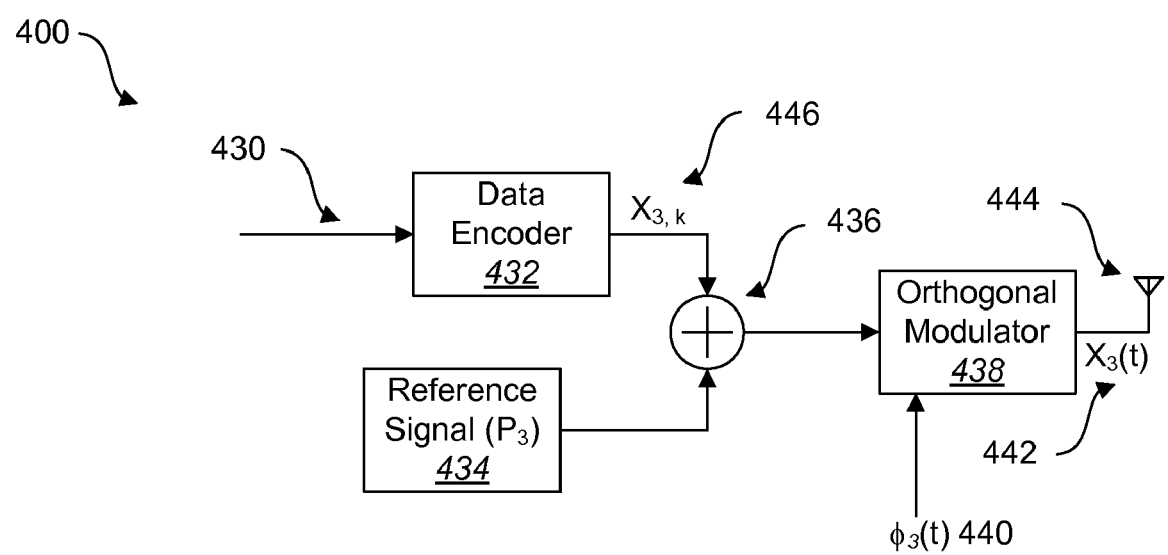
FIG. 4b illustrates a block diagram of another embodiment of a transmitter which may transmit data signals to a receiver.

FIG. 4b is a block diagram illustrating one embodiment of a transmitter 400 in which a single transmitter antenna 444 is used to transmit a data signal $x_3(t)$ 442 simultaneously with a reference signal $P_3$ 434 using an orthogonal modulation.

A signal 430 may be encoded by a data encoder 432 which serves to change a signal or data into code. The output of the data encoder 432 may be referred to as $x_{3,k}$ 446. A summation function 436 may sum the output of the data encoder 432 with the reference signal 434. An orthogonal modulator 438 may modulate the summed signals with orthogonal functions $\phi_3(t)$ 440. The transmitter antenna 444 may transmit the modulated signal to a receiver.

Figure 5:
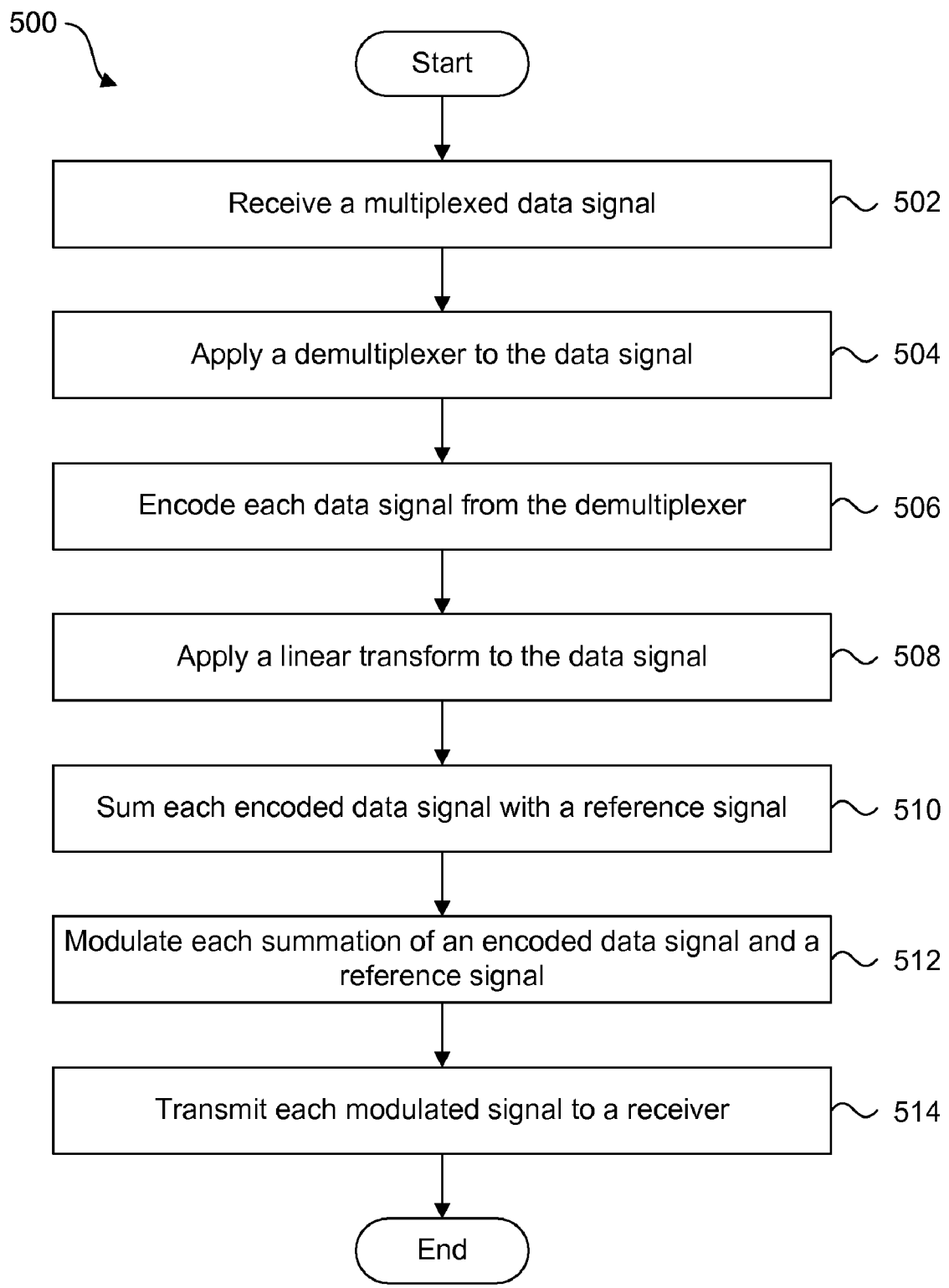
FIG. 5 is a flow diagram illustrating one embodiment of a method of transmitting data signals to the receiver.

FIG. 5 is a flow diagram illustrating one embodiment of a method 500 to transmit data. In one embodiment, the transmitter 400 may implement the method 500. The method 500 begins and the transmitter 400 receives 502 a multiplexed data signal. The transmitter 400 may apply 504 a demultiplexer 404 to the data signal. In one embodiment, the demultiplexer 404 may be applied 504 to the data signal in order to split the multiplexed data signal into multiple data signals as previously explained.

After the demultiplexer 404 has been applied 504 to separate the data signal, each individual data signal may be encoded 506. In one embodiment, a linear transformation may be applied 508 to the data signal which projects the data signal into a null-space of a plurality of reference signals. In one embodiment, the null-space is a set of all vectors such that when they are multiplied by a matrix, the zero vector is the result. The method 500 continues and each encoded data signal may be summed 510 together with a reference signal. The summation of each encoded data signal and reference signal may then be modulated 512. In one embodiment, the orthogonal modulator 420a modulates the summation as previously explained. The method 500 continues and the transmitter 400 transmits 514 each modulated signal including both the data signal and the reference signal to a receiver.

Figure 6:
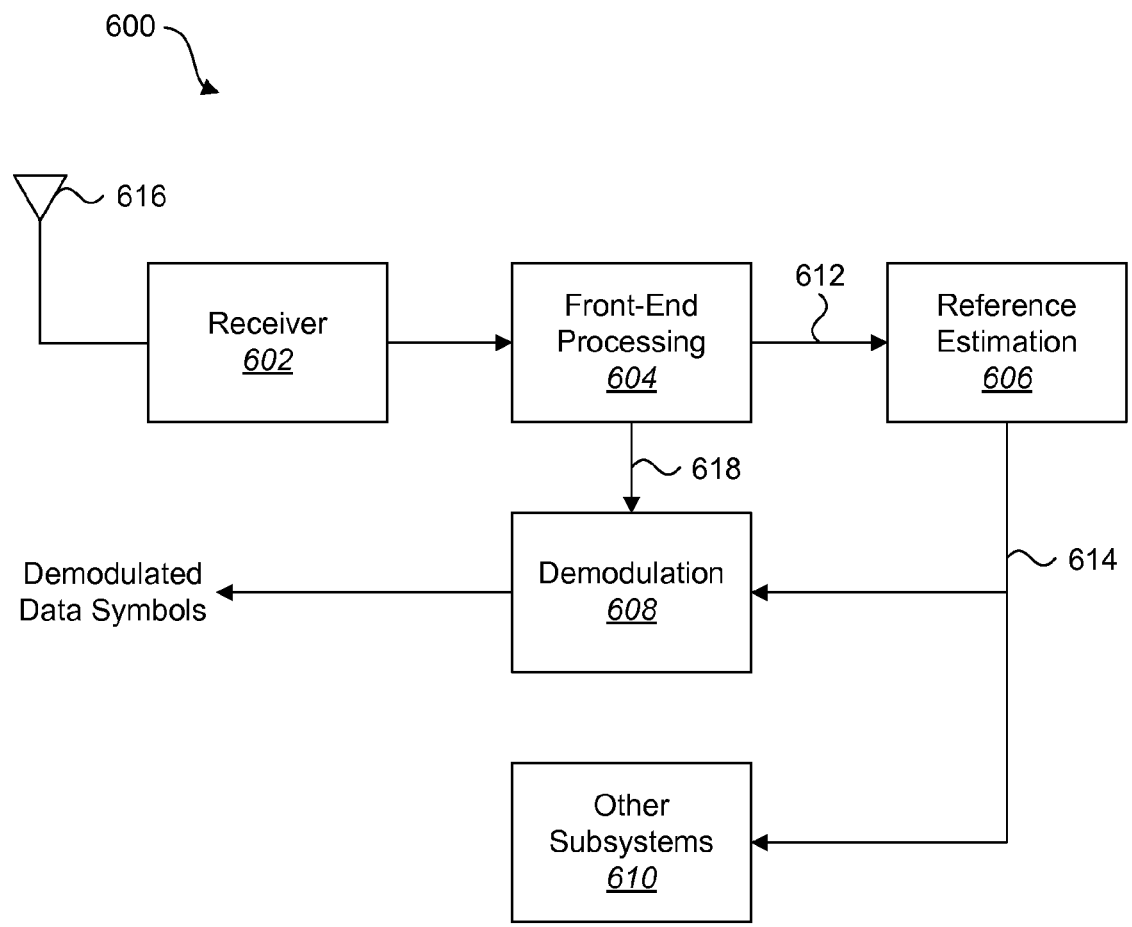
FIG. 6 illustrates a block diagram of one embodiment of the receiver which may receive data signals from the transmitter.

FIG. 6 illustrates a block diagram 600 of certain components in an embodiment of a receiver 602. Other components that are typically included in the receiver 602 may not be illustrated for the purpose of focusing on the novel features of the embodiments herein.

A signal may be received at an antenna 616. In one embodiment, the signal includes both the reference signal and the data sent from the transmitter 400. The signal is provided by the antenna 616 to the receiver 602. The receiver 602 downconverts the signal and provides it to a front-end processing component 604. The front-end processing component 604 may separate the reference signal from the data signal. The front-end processing component 604 may provide the received reference signal 612 to a reference estimation component 606. The received reference signal 612 typically includes noise and usually suffers from fading. The front-end processing component 604 may also provide the data 618 to a demodulation component 608 that demodulates the data signal.

The reference estimation component 606 may provide an estimated reference signal 614 to the demodulation component 608. The reference estimation component 606 may also provide the estimated reference signal 614 to other subsystems 610.

Additional processing takes place at the receiver 602. Generally, the reference estimation component 606 operates to estimate the reference signal and effectively clean-up the reference signal by reducing the noise and estimating the original reference (sometimes referred to as pilot) signal that was transmitted.

Figure 7:
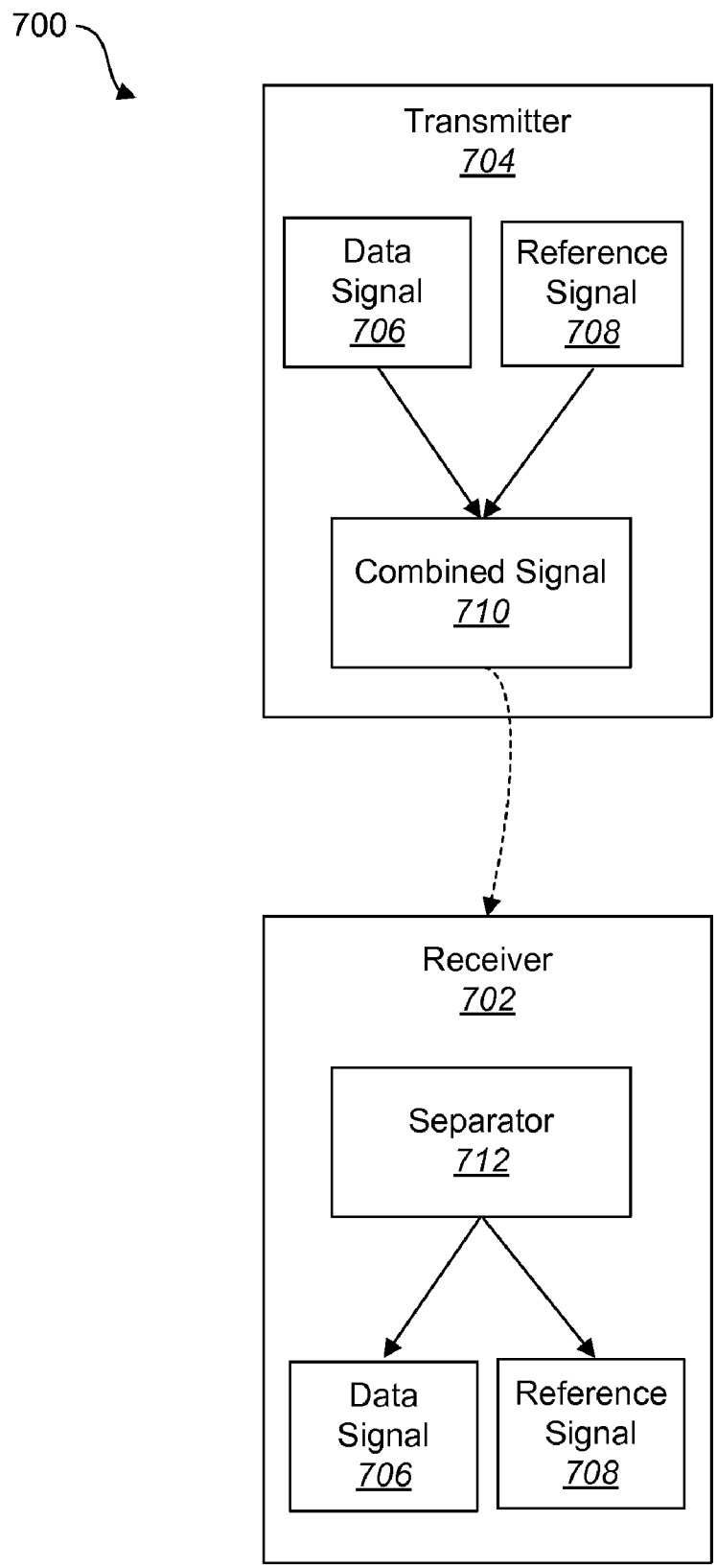
FIG. 7 is a block diagram illustrating one embodiment of the transmitter transmitting a combined signal to the receiver.

FIG. 7 is a block diagram 700 illustrating an embodiment of the transmitter 704 and the receiver 702. In one embodiment, the transmitter 704 may include a data signal 706 and a reference signal 708. The data signal 706 and the reference signal 708 may be combined into a single combined signal 710. The transmitter 704 may further transmit the combined signal 710 to the receiver 702. The receiver 702 may include a separator 712 which serves to separate the data signal 706 from the reference signal 708.

Figure 8:
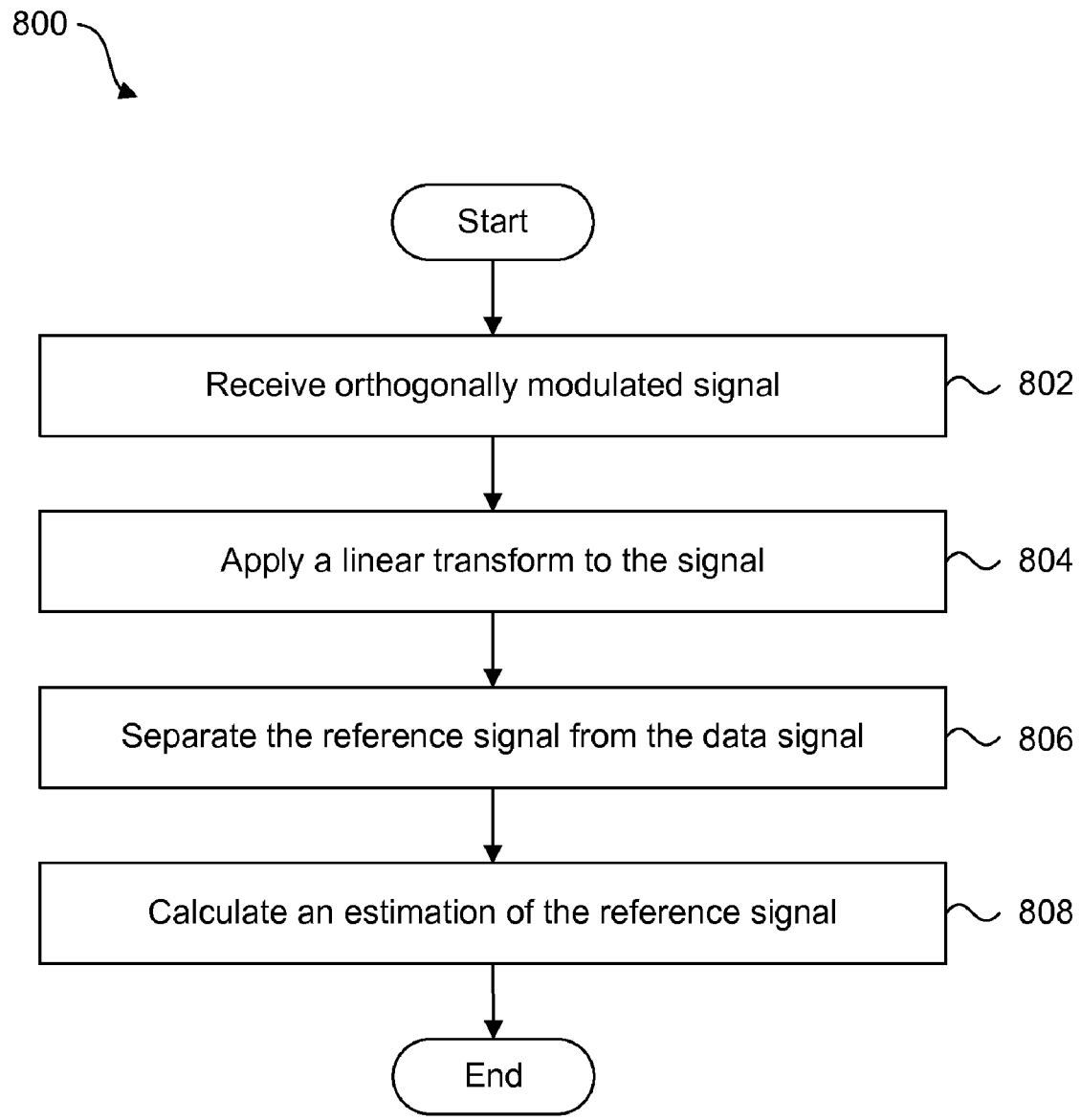
FIG. 8 is a flow diagram illustrating one embodiment of a method of receiving data signals from the transmitter.

FIG. 8 is a flow diagram illustrating one embodiment of a method 800 for receiving the combined signal 710 and separating the data signal 706 from the reference signal 708. The method 800 may be implemented by the receiver 702. The method 800 begins and the receiver 702 receives 802 an orthogonally modulated signal. In one embodiment, the signal includes the combined signal 710 as previously explained. The method 800 continues and a linear transform is applied 804 to the combined signal 710. In one embodiment the linear transform includes a matrix multiplication operation. Once the linear transform is applied 804 to the combined signal 710, the reference signal 708 is separated 806 from the data signal 706. After separation of the signals, the method 800 continues and an estimation of the original reference signal 706 is calculated 808. Further details about combining and separating the data signal 706 and the reference signal 708 are provided below.

Figure 9:
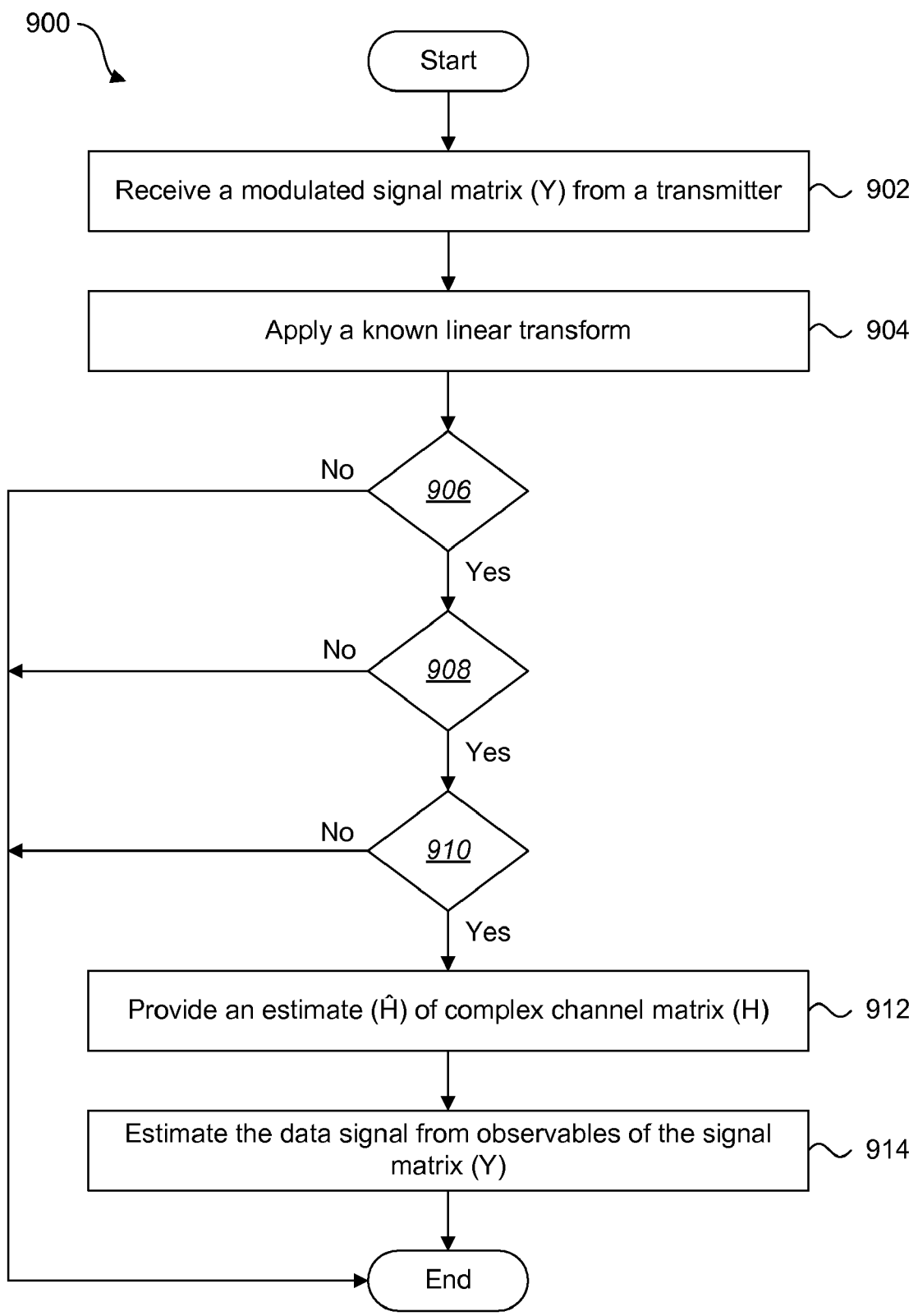
FIG. 9 is a flow diagram illustrating a further embodiment of receiving data signals from the transmitter.

FIG. 9 is a flow diagram illustrating one embodiment of a method 900 for separating reference signals from data signals. In one embodiment, the method 900 may be implemented in a flat-fading model over a period of n symbols. The following notation may be employed for the discussion pertaining to the method 900.

A matrix written as $B_{n...m, i...j}$ indicates the n-th through m-th rows and i-th through j-th columns of the (larger) matrix B. Let $Y=[y(t_1) y(t_2) \ldots y(t_n)]$ be a $m_R \times n$, received signal matrix, for time samples $\{t_1, \ldots t_n\}$ $X^{(p)}=[x^{(p)}(t_1) x^{(p)}(t_2) \ldots x^{(p)}(t_n)]$, be a $m_T \times n$, reference signal matrix, and $X1 \ldots m_T$, $1 \ldots (n-m_T)^{(d)}=[x^{(d)}(t_1) x^{(d)}(t_2) \ldots x^{(d)}(t(n-m_T))]$, be a $m_T \times n - m_T$ data matrix. V may include an $m_T \times m_T$ matrix to be determined. As such, $X^{(d)}=[x^{(d)}(t_1) x^{(d)}(t_2) \ldots x^{(d)}(t(n-m_T)) \; V]$, because V may be chosen to be a deterministic function of the data, and the a priori known reference signals. In addition, any column of $X^{(d)}$ as well as $X^{(p)}$ may include unit norm; that is, the sum of the squares of its magnitude may be unity. Further, additive noise may be expressed as a matrix $W=[w(t_1) w(t_2) \ldots w(t_n)]$, which may include an additive noise vector. The additive noise may be white, complex, circularly symmetric distributed noise, with unit variance and with independent components at each antenna of a receiver.

The method 900 starts and a modulated signal may be received 902. In one embodiment, the method 900 is implemented in a MIMO system. The received signal may be a signal matrix. In matrix notation, over $t_1$ to $t_n$, the received signal may be expressed as:

$$Y = H\left[\sqrt{\frac{\rho_p}{m_T}} X^{(p)} + \sqrt{\frac{\rho_d}{m_T}} X^{(d)}\right] + W \quad (3)$$

Here $\rho_p$ and $\beta_d$ may be the SNR for reference signals (training) and data signals respectively. The method 900 may be implemented to use the reference signals to provide an estimate $\hat{H}$ of H by using a conditional mean of equation (3) and equation (15) (provided below) based on the observables Y. This may be achieved by applying 904 a known linear transform at the receiver. Applying 904 the linear transform may imply that at the receiver, $\hat{H}=YA$ is performed.

In order for $\hat{H}=YA$, conditions may be required to be satisfied. The method 900 continues and determines 906 if the following condition is satisfied:

$$A=(X^{(p)})^H \quad (4)$$

If the method 900 determines 906 that equation (4) is not met, the method 900 ends. Regarding equation (4), $(\;)^H$ may denote a conjugate transpose. In one embodiment, the condition in equation (4) may be satisfied if the rows of $X^{(p)}$ are orthogonal to each other.

If the method 900 determines that the condition 906 is satisfied, the method 900 continues and determines 908 if the following condition is satisfied:

$$X^{(d)}A=X^{(d)}(X^{(p)})^H=01 \ldots m_R, 1 \ldots m_T \quad (5)$$

If the condition expressed in equation (5) is not met, the method 900 ends. In one embodiment, equation (5) may imply $[x^{(d)}(t_1) x^{(d)}(t_2) \ldots x^{(d)}(t(n-m_T))V] (X^{(p)})^H=01 \ldots m_R, 1 \ldots m_T$ which may also imply that with $F=(X^{(p)})^H n-(m_T-1) \ldots n, 1 \ldots m_T$, and $G=(X^{(p)})^H 1 \ldots (n-m_T), 1 \ldots m_T$, then $VF=X1 \ldots m_T, 1 \ldots (n-m_T)^{(d)} G$, and therefore:

$$V=-X1 \ldots m_T, 1 \ldots (n-m_T)^{(d)} GF^{-1} \quad (5a)$$

If the method 900 determines 908 the condition in equation (5) is satisfied, the method 900 continues and determines 910 if the following condition is also satisfied:

$$F=(X^{(p)})^H n-(m_T-1) \ldots n, 1 \ldots m_T \quad (6)$$

The condition in equation (6) may be satisfied if equation (6) has full rank $(m_T)$. If the condition of equation (6) is satisfied, the method 900 continues and provides 912 and estimate $\hat{H}$ of H. The method 900 further continues and estimates 914 the data signal (multiplied by the matrix A) from the observables with the reference signal cancelled. In other words: $A\hat{H}=Y-\hat{H}X^{(p)}$. In one embodiment, the structure of $X^{(p)}$ is such that not only are the rows $x_i^{(p)}(t)$ orthogonal to each other, but also the subsets of rows $[x_i^{(p)}(t_1) \ldots x_i^{(p)}(t_{n-m_T})]$ are orthogonal to each other, as are the rows of $X^{(p)}$ $n-(m_T-1) \ldots n, 1 \ldots m_T$. In particular, this may imply $F^{-1}=C11 \ldots m_T, 1 \ldots m_T$, where $11 \ldots m_T, 1 \ldots m$ denotes an identity matrix of $m_T$ rows and $m_T$ columns.

The method 900 may be implemented utilizing time division multiple access (TDMA) reference signals. With TDMA reference signals, $F=I1 \ldots m_T, 1 \ldots m_T$, and $G=01 \ldots (n-m_T), 1 \ldots m_T$. The results of equation (3) may apply, namely the optimal energy (with unconstrained power) and so forth.

In addition, the method 900 may be implemented utilizing Walsh function reference signals. As an example, n=64, $m_T=m_R=4$. $W(k,n)$ may be denoted as Walsh code k in an n-length Walsh matrix. This may imply the k-th row of $H(\log_2(n))$ of the Hadamard matrix, where $n=2^m$. In this example, H is not the channel matrix H referred to above. In one embodiment, the last rows of the Hadamard matrix (64×64) may be used as the reference signal sequences. These signals may be scaled because the terms relating to the data and reference signal energy have not yet been expressed. From the above definitions, $F=(X^{(p)})^H n-(m_T-1)\ldots n,1\ldots m_T$ is invertible (it is the last 4 rows and columns of H) when normalized:

$$F = C \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

where C scales according to the pilot power. In addition, the optimal energy may be applied to the pilot power (over all n=64 symbols).

As previously explained above, the reference and data signals may be combined orthogonally. In other words, a pilot signal (and multiple pilot reference signals in the case of MIMO systems) may be sent contemporaneously with data signals if that channel statistics are relatively constant over a multiplicity of symbol periods. As previously explained, this may be achieved by performing a linear transformation on blocks of data (which may correspond to data from successive time samples or from successive antennas or both). The linear transformation may project the data into a "null space" of the reference signal(s). The linear transformation may be that which minimizes peak-to-average power (PAPR) and may be found at least via a numerical optimization method restricted to a class of matrices whose columns are orthogonal to the reference signals. The following illustrates an example of implementing such a method known as the Gram-Schmidt method. The Gram-Schmidt method may serve to combine the data and reference signals orthogonally.

The equations ((4)-(6)) may still include a higher PAPR than desired. For example, if $x_i^d(t)$ is the i-th row of $[x^{(d)}(t_1) x^{(d)}(t_2) \ldots x^{(d)}(t(n-m_T))]$, then the least upper bound for any entry in V would be given by $\|V\|_\infty \leq C < x_i^{(d)}(t)$, $$x_i^{(d)}(t) >= C \sum_{k=1}^{n} x_i^{(d)}(t_k) x_i^{(d)*}(t_k) = Cn,$$

where C is a constant based on the transmitted energies of the pilot and data. In one embodiment, reference symbols that align precisely with data symbols might not be used; e.g., if a designer were using quadrature phase-shift keying (QPSK) as a data modulation, the designer may choose reference signals with constellation points between the data constellation points so that an additional 3 dB of decorrelation might be gained.

The correlation may be "amortized" over the entries of each of the rows by rotating the vectors $x_i^d(t)$ according to the Gram-Schmidt method. In order to obtain the correct form of the solution, a different notation may be utilized such as:

$$\|x_k^{(p)}(t_1) \ldots x_k^{(p)}(t_{(n-m_T)})\|_2 = \sqrt{\sum_{j=1}^{n-m_T} |x_k^{(p)}(t_j)|^2} = \alpha, \quad (7)$$

as well as:

$$|x_k^{(p)}(t(n-m_T+1))) \ldots x_k^{(p)}(t_n)\|_2 = 1-\alpha \quad (8)$$

so that:

$$\|x_k^{(p)}(t_1) \ldots x_k^{(p)}(t_n)\|_2 = 1. \quad (8a)$$

It may also be assumed that:

$$\|x_k^{(d)}(t_1) \ldots x_k^{(d)}(t(n-m_T))\|_2 = 1. \quad (9)$$

Utilizing the notation used previously, but with signal energies included, the received signal Y may be expressed as:

$$Y = H\left[\sqrt{\frac{\rho_p}{m_T}} X^{(p)} + \sqrt{\frac{\rho_d}{m_T}} X^{(d)}\right] + W. \quad (10)$$

As before, $\rho_p$ and $\rho_d$ may be the SNRs for training and data respectively.

However, instead of transmitting $$\sqrt{\frac{\rho_d}{m_T}} X_{1\ldots m_T, 1\ldots(n-m_T)}^{(d)},$$

the following may be transmitted, $$\sqrt{\frac{\rho_d}{m_T}} Z^{(d)}$$

instead, where any row $[z_i(t_1) \ldots z_i(t(n-m_T))]$ is given by, with β a known constant such that $0 \leq \beta \leq 1$, and using the Gram-Schmidt procedure:

$$z_i(t) = x_i^{(d)}(t) - \beta \sum_{k=1}^{m_T} x_k^{(p)}(t) \frac{1}{\|x_k^{(p)}(t)\|} \sum_{j=1}^{n-m_T} x_i^{(d)}(t_j) x_k^{(p)*}(t_j). \quad (11)$$

This may be expressed in a more convenient matrix form as:

$$Z^{(d)} = X1 \ldots m_T, 1 \ldots (n-m_T)^{(d)} - \beta \Gamma X1 \ldots m_T, 1 \ldots (n-m_T)^{(p)} \quad (12)$$

Where the i-th row and j-th column entry of Γ is given by:

$$g_{ij} = \frac{1}{\|x_k^{(p)}(t)\|} \sum_{j=1}^{n-m_T} x_i^{(d)}(t_j) x_k^{(p)*}(t_j). \quad (13)$$

The last term (multiplied by $$\sqrt{\frac{\rho_d}{m_T}}$$

and scaled by $\beta$) may represent the correlation between $x_t(t)$ and each of the signals in $X1 \ldots m_T, 1 \ldots (n-m_T)^{(p)}$. Then, instead of transmitting $V = -X1 \ldots m_T, 1 \ldots (n-m_T)^{(d)}GF^{-1}$, the following may be transmitted instead:

$$V = -\sqrt{\frac{\rho_d}{m_T}} Z_{1\ldots m_T, 1\ldots (n-m_T)}^{(d)} GF^{-1} \quad (14)$$

$$= -(1-\beta)\sqrt{\frac{\rho_d}{m_T}} X_{1\ldots m_T, 1\ldots (n-m_T)}^{(d)} GF^{-1}. \quad (15)$$

Here, $G = (X^{(p)})^H 1 \ldots (n-m_T), 1 \ldots m_T$, and $F = (X^{(p)})^H n - (m_{T-1}) \ldots n, 1 \ldots m_T$ as illustrated previously. At the receiver side, it may be verified that by multiplying Y with $(X^{(p)})^H$ yields:

$$Y(X^{(p)})^H = \left(H\left[\sqrt{\frac{\rho_p}{m_T}} X^{(p)} + \sqrt{\frac{\rho_d}{m_T}} [Z^{(d)} \ V]\right] + W\right)(X^{(p)})^H \quad (16)$$

So that:

$$E(Y(X^{(p)})^H) = E\left(\left(H\left[\sqrt{\frac{\rho_p}{m_T}} X^{(p)} + \sqrt{\frac{\rho_d}{m_T}} [Z^{(d)} \ V]\right] + W\right)(X^{(p)})^H\right) \quad (17)$$

$$= \sqrt{\frac{\rho_p}{m_T}} H + H\sqrt{\frac{\rho_d}{m_T}} [Z^{(d)} \ V](X^{(p)})^H \quad (18)$$

But since $\sqrt{\frac{\rho_d}{m_T}} [Z^{(d)} \ V](X^{(p)})^H =$ $$\sqrt{\frac{\rho_d}{m_T}} \left[X_{1\ldots m_T, 1\ldots (n-m_T)}^{(d)} - \beta \Gamma X_{1\ldots m_T, 1\ldots (n-m_T)}^{(p)}\right]$$

$$(X^{(p)})_{1\ldots (n-m_T), 1\ldots m_T}^H$$

$$-(1-\beta)\sqrt{\frac{\rho_d}{m_T}} X_{1\ldots m_T, 1\ldots (n-m_T)}^{(d)} G, \quad (19)$$

$X1 \ldots m_T, 1 \ldots (n-m_T)^{(d)} (X^{(p)})^H 1 \ldots (n-m_T), 1 \ldots m_T = \alpha \Gamma$ the following may exist:

$$\sqrt{\frac{\rho_d}{m_T}} [Z^{(d)} \ V](X^{(p)})^H = 0 \quad (20)$$

In addition, the V matrix may also represent an important part in reconstituting the original data matrix $X1 \ldots m_T, 1 \ldots (n-m_T)^{(d)}$; since $F^{-1}$ is known, $$VF = -(1-\beta)\sqrt{\frac{\rho_d}{m_T}} X_{1\ldots m_T, 1\ldots (n-m_T)}^{(d)} \quad G = -\alpha(1-\beta)\sqrt{\frac{\rho_d}{m_T}} \Gamma \quad (21)$$

and, therefore, reception of V allows the reconstruction of the original data sequence $X1 \ldots m_T, 1 \ldots (n-m_T)^{(d)}$.

Also, by choosing $\beta = \frac{1}{2}$, and by performing the Gram-Schmidt procedure as outlined above, an additional reduction in peak value of the V matrix of 3 dB may be gained. Reconstruction of the original data constellation at the receiver side may be obtained by the use of the transmitted matrix V, and the fact that the pilot signals are known to the receiver.

The mathematical disclosure provided above regarding FIG. 9 may be generalized as follows: Instead of transmitting, $$Z = \left[\sqrt{\frac{\rho_p}{m_T}} X^{(p)} + \sqrt{\frac{\rho_d}{m_T}} X^{(d)}\right],$$

the following may be transmitted:

$$Z = \left[\sqrt{\frac{\rho_p}{m_T}} X^{(p)} + \sqrt{\frac{\rho_d}{m_T}} AX^{(d)}\right] \quad (22)$$

In one embodiment, Z from the equation (22) may be transmitted from a single antenna. $X^{(d)}$ may be a column vector with length $n-1$ which is mapped by a matrix A into a column vector of n rows, with n the coherence time of a flat fading channel. In an additional embodiment, $X^{(d)}$ may represent a matrix consisting of $n-1$ rows and $M^{(n-1)}$ columns, with M being the order of the modulation; in such a case $X^{(d)}$ may represent all possible values of transmitted signal over $n-1$ time samples. The following notation may be expressed: $Z^{(d)} = AX^{(d)}$. The matrix A may include certain properties which are discussed below.

The matrix A may include a singular value decomposition (SVD) of the form $A = U\Sigma V^H$, where $U \in \mathcal{C} n \times n$, $\Sigma \in \mathcal{C} n \times (n-1)$, and $V \in \mathcal{C}(n-1) \times (n-1)$, with U and V unitary matrices, and $\Sigma$ a matrix of singular values on the diagonal. In order to maintain the distance between different values of $AX^{(d)}$ in additive noise, the matrix A may be an isometry (i.e., it preserves distance in Euclidean measure) and therefore, $\Sigma$ has the form of all ones on the diagonal, except for the last row, which may be zero. In order to maintain orthogonality of the reference (or pilot) signal, $X^{(p)}$ must be in the null space of the matrix A. This is maintained if (a normalized form of) $X^{(p)}$ appears in the last column (and row) of U. In other words, the matrix U may be an orthonormal basis which includes $X^{(p)}$ in its last row and column.

Based on the above, $$A = U\begin{bmatrix} V^H \\ 0 \end{bmatrix}.$$

It may also be verified that indeed $$X^{(p)H} U \begin{bmatrix} V^H \\ 0 \end{bmatrix} = 0.$$

The matrix A may possess a left inverse (equal to $A^H$) which, when multiplied with the received signals, yields back the original data. This may also imply that A has rank n−1. It may also indicate how the original data may be reconstructed from the received signal. In one embodiment, the original data may be reconstructed by multiplying the received signal by $A^H$ appended with $X^{(p)H}$, and then forming the usual soft-decisions.

If $U = \begin{bmatrix} U(1:n-1, 1:n-1) & X^{(p)}(1:n-1) \\ X^{(p)H}(1:n-1) & X^{(p)}(n) \end{bmatrix}$ (as may be implied above), then $$A = \begin{bmatrix} U(1:n-1, 1:n-1)V^H \\ X^{(p)H}(1:n-1)V^H \end{bmatrix}.$$

This formulation may imply that $X^{(p)}(n)$ is real, yet it otherwise disappears completely from the formulation of A.

Figure 10:
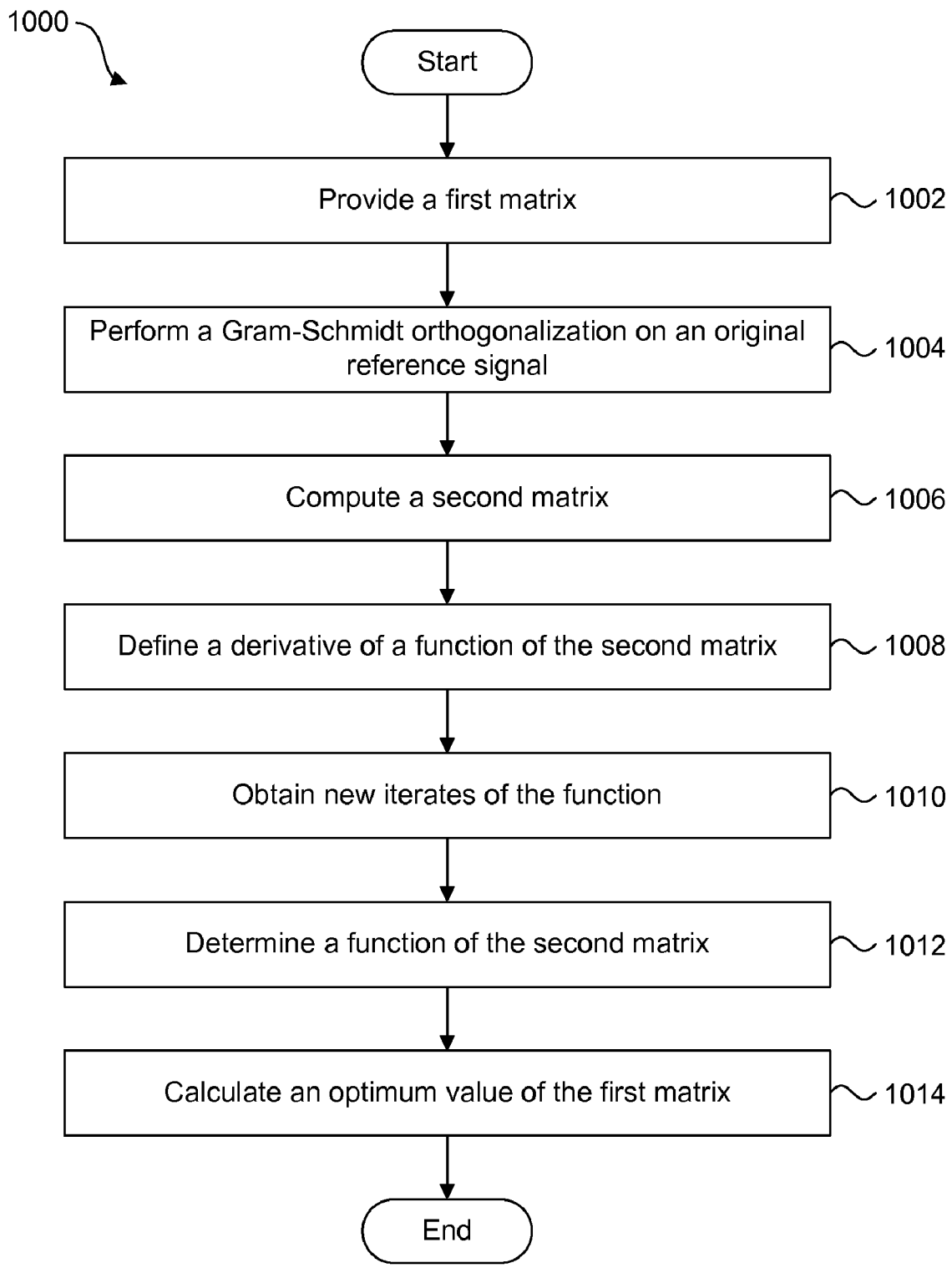
FIG. 10 is a flow diagram illustrating one embodiment of a method to obtain an optimum matrix in order to obtain an optimum transmission format of a reference signal.

FIG. 10 is a flow diagram illustrating one embodiment of a method 1000 to obtain an optimum matrix in order to obtain an optimum transmission format of a reference signal. In one embodiment, obtaining the optimum matrix may include calculating all possible matrices such that its SVD is as described above. Then, under the constrained set of matrices, calculate the one matrix that minimizes the PAPR for a given data constellation set.

The method 1000 begins and a first matrix is provided 1002. The matrix may be required to satisfy certain orthogonality conditions. In one embodiment, a Gram-Schmidt orthogonalization is performed 1004 on an original reference (or pilot) signal as previously explained. Performing 1004 the Gram-Schmidt orthogonalization may provide a first matrix that satisfies the orthogonality conditions.

In one embodiment, a second matrix is computed 1006 which may include the set of matrices forming an orthogonal set. In one embodiment, the second matrix may be closed and bounded. In one embodiment, a derivative is defined 1008 of a function of the second matrix. In one embodiment, the derivative may be defined 1008 with respect to the tangent hyper-plane at the second matrix. In one embodiment, new iterates of the function are obtained 1010. The new iterates may be obtained 1010 by projecting the second matrix back onto a Stieffel manifold which is described below in more detail.

In one embodiment, a function of the second matrix is determined 1012. In a further embodiment, an optimum value of the first matrix is calculated 1014.

For some classes of signal constellations, the matrix that minimizes the PAPR may be the identity matrix. The following illustrates this embodiment for binary phase-shift keying (BPSK) by implementing a 2×2 matrix and using induction on higher values of n. In one embodiment, the relation $$A = \begin{bmatrix} U(1:n-1, 1:n-1)V^H \\ X^{(p)H}(1:n-1)V^H \end{bmatrix}$$

represents a set of constraints on the matrix A. The optimization criterion may be provided by:

$$\mathcal{P} = \frac{\left\| \sqrt{\frac{\rho_p}{m_T}} X^{(p)} + \sqrt{\frac{\rho_d}{m_T}} Z^{(d)} \right\|_\infty^2}{\mathrm{trace}\left( E\left[ \left( \sqrt{\frac{\rho_p}{m_T}} X^{(p)} + \sqrt{\frac{\rho_d}{m_T}} Z^{(d)} \right)^H \left( \sqrt{\frac{\rho_p}{m_T}} X^{(p)} + \sqrt{\frac{\rho_d}{m_T}} Z^{(d)} \right) \right] \right)} \quad (23)$$

In the case of the minimization problem above, and given that the average power may be fixed by requirements for bit/symbol error, and provided that the matrix A is an isometry, the problem may be reduced to finding the matrix A that minimizes:

$$\mathcal{P}_1 = \left\| \sqrt{\frac{\rho_p}{m_T}} X^{(p)} + \sqrt{\frac{\rho_d}{m_T}} Z^{(d)} \right\|_\infty^2 \quad (24)$$

The problem may be solvable if A were constrained to have certain values for certain specific values of $X^{(d)}$, however another means may have to be found to guarantee isometry for A. A direct solution to the problem, for the case when $X^{(d)}$ represents all possible values of a transmitted signal over n−1 time samples, may be computationally difficult, especially when dealing with modulations such as 64 QAM and time intervals of the order of 10 symbols or greater. For these reasons, the problem may be solved by solving the problem for a random Gaussian matrix with independent elements and circular symmetry (meaning real and imaginary parts having the same statistics) determining the solution as a statistical result based on the statistics of the maximum element of the received vector Z.

The constraint that $A^H A = I$ may imply that the columns of A are orthogonal to each other. If a way exists to search the space of (in general, complex) matrices A such that $A^H A = I$ and $X^{(p)H} A = 0$, a solution to the problem may also exist.

In one embodiment, the set of orthogonal matrices such that $A^H A = I$ and $X^{(p)H} A = 0$ may not be a convex set. In other words, if $A_1$ is such a matrix and $A_2$ is such a matrix, it is not necessarily true that $\alpha A_1 + (1-\alpha) A_2$ is such a matrix, where $0 \leq \alpha \leq 1$. However, the set of such matrices may determine what is referred to as a Stiefel manifold. Among the properties of interest of the Stiefel manifold are that it may be compact—that is, it is closed and bounded. This may be illustrated with a simple matrix in two dimensions with some increments therein. In one embodiment, the matrix A may be given by:

$$A = \begin{bmatrix} a_{11} & a_{12} \\ a_{21} & a_{22} \\ a_{31} & a_{32} \end{bmatrix}$$

and a compact matrix A+

$$\delta A = \begin{bmatrix} a_{11}+\delta_{11} & a_{12}+\delta_{12} \\ a_{21}+\delta_{21} & a_{22}+\delta_{22} \\ a_{31}+\delta_{31} & a_{32}+\delta_{32} \end{bmatrix}$$

may also be considered. If any one value, $\delta_{ij}$, is fixed such that the column in which the $\delta_{ij}$ appears still has unit energy (i.e., the sum of the squares of the magnitude of the column entries is 1) there may exist values of the other $\delta_{ij}$ such that orthogonality and unit energy may be maintained. In one embodiment, the condition for the preservation of orthonormality for an increment of A may include: $(A+\delta A)^H(A+\delta A)=I$ so that $\delta A^H A + A^H \delta A = 0$, and $X^{(p)H}(A+\delta A)=0$. These conditions may imply that $A^H \delta A$ is skew symmetric, and there may be $n(n-1)/2$ unique values on $\delta A$. In one embodiment, a skew symmetric matrix has a transpose which is the negative of the original matrix.

Because of this property, the Weierstrass theorem may indicate that there is an optimum value of A. It may also indicate a method of solution for finding the best optimum value of A. For example, starting with a value of A confined to the Stieffel manifold determined by $X^{(p)}$, moving along the Stieffel manifold in order to evaluate $\mathcal{P}A)$, and then determining the minimum value of $\mathcal{P}A)$. In one embodiment, numerical optimization methods may be implemented to obtain the optimum $\mathcal{P}A)$. The equation (24) from above may then be evaluated as:

$$(\mathcal{P}A) = E\left(\left\|\sqrt{\frac{\rho_p}{m_T}}X^{(p)} + \sqrt{\frac{\rho_d}{m_T}}Z^{(d)}\right\|_\infty\right)^2 \quad (25)$$

The equation (25) represents the square of the expected value of the maximum modulus of the quantity inside the brackets. If a Gaussian random input is considered with known statistics then the value of Z may be chi-squared and correlated.

Figure 11:
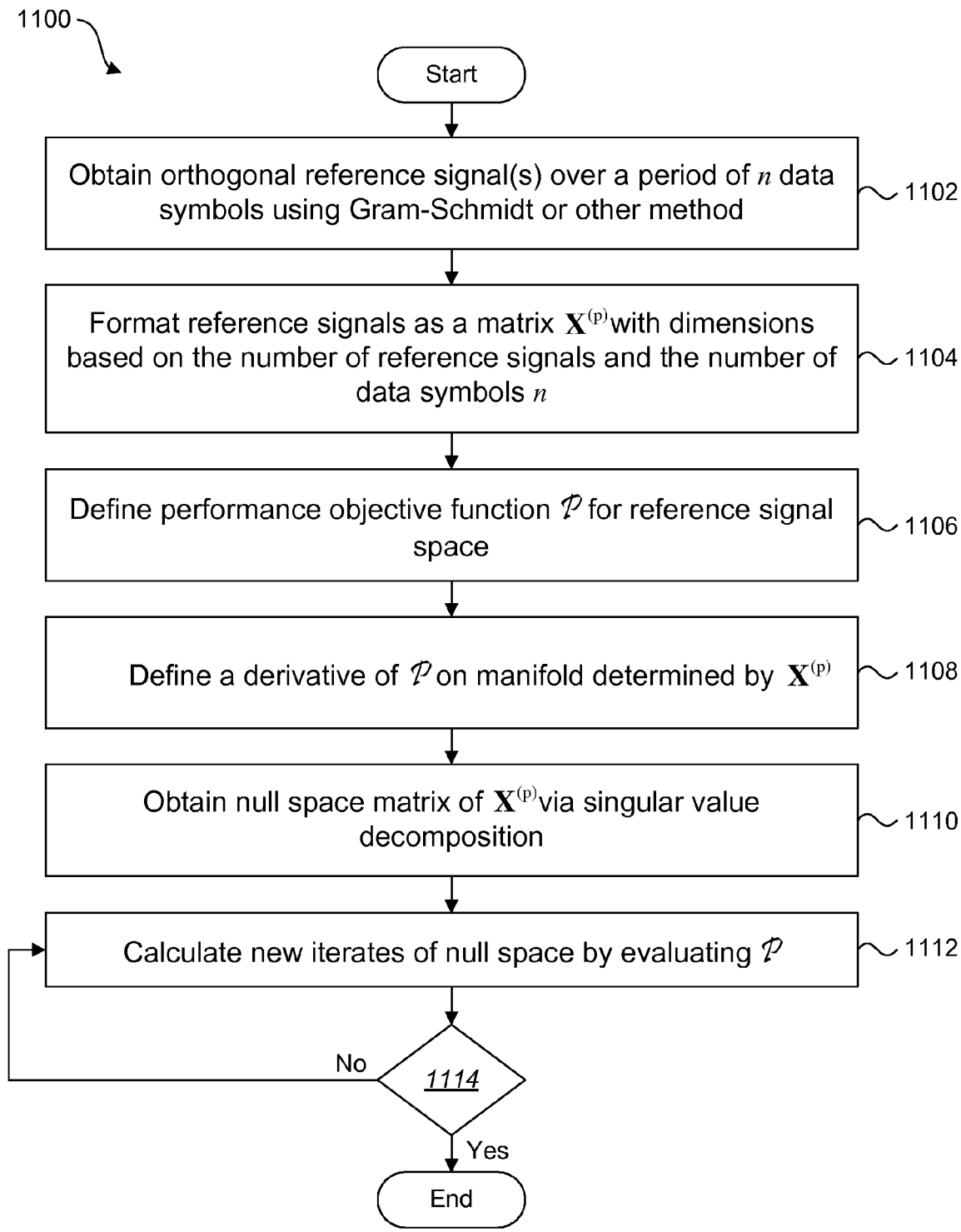
FIG. 11 is a flow diagram illustrating one embodiment of a mathematical method to determine an optimum matrix.

FIG. 11 is a flow diagram illustrating a mathematical method 1100 to determine an optimum matrix A. The method 1100 begins by obtaining 1102 an orthogonal reference signal(s) over a period of n data symbols using a Gram-Schmidt or other similar method. The reference signals are formatted 1104 as a matrix $X^{(p)}$ with dimensions based on the number of reference signals and the number of data symbols n. In one embodiment, a performance objective function $\mathcal{P}$ is defined 1106 for reference signal space. A derivative of $\mathcal{P}$ is defined 1108 on manifold determined by $X^{(p)}$. The null space of matrix $X^{(p)}$ is obtained 1110 via SVD. New iterates of the null space are calculated 1112 by evaluating $\mathcal{P}$.

It is determined 1114 if the derivative of $\mathcal{P}$ is sufficiently close to zero and if changes indicate an increase in $\mathcal{P}$ If the derivative of $\mathcal{P}$ is close to zero and changes indicate an increase in $\mathcal{P}$ the method 1100 ends. If the derivative of $\mathcal{P}$ is not close to zero and changes do not indicate an increase in $\mathcal{P}$ the method 1100 continues to calculate 1112 new iterates of the null space by evaluating $\mathcal{P}$ In one embodiment, to obtain an actual optimum value for A, the matrix A may include runs of a plurality of sample values of $X^{(d)}$. In an additional embodiment, the matrix A may include all of the values of $X^{(d)}$ if $X^{(d)}$ takes on values from a finite alphabet as is the case in QPSK or quadrature amplitude modulation (QAM), evaluate the maximum magnitude (or magnitude squared) of the elements of Z (i.e., $\mathcal{P}A$)), increment A using the relationships derived above for $A+\delta A$, and compute a new $\mathcal{P}A+\delta A$), and in effect form a sample derivative of $\mathcal{P}A$) with respect to a change $+\delta A$. In one embodiment, $X^{(p)}$ is known.

If the distribution function (df) of X is assumed, the probability distribution function (pdf) of the elements of Z may be determined as well as their joint distribution function. With $$\zeta_{max} = \max_i |z_j|^2,$$

the pdf of $\zeta_{max}$ may be determined as:

$$P[\zeta_{max} \leq \zeta] = P[|z_1|^2 \leq \zeta \cap |z_2|^2 \leq \zeta \cap \ldots \cap |z_n|^2 \leq \zeta]. \quad (26)$$

If the process $X^{(d)}$ is an i.i.d. Gaussian process, with circular symmetry and unit variance, then the statistics of Z may also be Gaussian distributed; however, since A is not of full rank, the standard distribution of a set of correlated Gaussian random variables may not be used. But, the statistics of Z in terms of the underlying statistics of $X^{(d)}$ may be expressed. In other words, $P[Z \leq Z] = P[X^{(d)} \leq A^H Z]$, and the marginal df of any $z_i$ may be a zero mean Gaussian random variable with variance $\sigma^2$ $$z_i = \sum_{j=1}^{n-1} |a_{ij}|^2 \sigma_x^2.$$

With this, the following may be evaluated, $P[\zeta_{max} \leq \zeta] = P[|z_1| \leq \zeta \cap |z_2| \leq \zeta \cap \ldots \cap |z_n| \leq \zeta]$. The form of the pdf of $X^{(d)}$ may be given by:

$$f(X^{(d)}) = \frac{1}{\pi^{n-1}} e^{-X^{(d)H}X^{(d)}} \quad (27)$$

so that the pdf of Z may be given by:

$$f(Z) = \frac{C(A)}{\pi^{n-1}} e^{-(A^H Z)^H A^H Z} = \frac{C(A)}{\pi^{n-1}} e^{-Z^H A A^H Z}. \quad (28)$$

The constant C(A) may be present to ensure that f(Z), integrated over $\mathcal{C}^{n-1}$, is unity. In one embodiment, $AA^H \neq I$, even though $A^H A = I$. Any component of Z, for example, $z_i$, may be the sum of a real and imaginary random variable. In one embodiment, $z_i = z_i^R + j z_i^I$, and also $Z = Z^R + j Z^I$. For each component, $z_i$, the transformation $r_i = |z_i|$, $\theta_i = \tan^{-1}(z_i^I/z_i^R)$, may be performed. Notions for $$r = \begin{bmatrix} r_1 \\ r_2 \\ \vdots \\ r_n \end{bmatrix} \text{ and } \theta = \begin{bmatrix} \theta_1 \\ \theta_2 \\ \vdots \\ \theta_n \end{bmatrix}$$

may provide an explicit expression for $P[\zeta_{max} \leq \zeta]$ as:

$$P[\zeta_{max} \leq \zeta] = \int_{r=0}^{\zeta} \int_{\theta=0}^{2\pi} \frac{C(A)}{\pi^{n-1}} r \quad (29)$$

$$e^{-\left(\sum_{i=1}^{n-1}\left(\sum_{k=1}^{n} a_{ki}^{R} r_k \cos\theta_k + a_{ki}^{I} r_k \sin\theta_k\right)^2 + \left(\sum_{k=1}^{n} a_{ki}^{I} r_k \cos\theta_k - a_{ki}^{R} r_k \sin\theta_k\right)^2\right)} d\theta dr$$

The expression in equation (29) may depend on $\theta$, and may be evaluated numerically; however $a_{ki}$ may be written as $|a_{ki}|(\cos\phi_k + j\sin\phi_k)$ so that $a_{ki}^R = |a_{ki}|\cos\phi_k$, and $a_{ki}^I = |a_{ki}|\sin\phi_k$, which may provide the following:

$$P[\zeta_{max} \leq \zeta] = \int_{r=0}^{\zeta} \int_{\theta=0}^{2\pi} \frac{C(A)}{\pi^{n-1}} r \quad (30)$$

$$e^{-\left(\sum_{i=1}^{n-1}(\Sigma_{k=1}^{n}|a_{ki}|r_k\cos(\phi_k-\theta_k))^2 + (\Sigma_{k=1}^{n}|a_{ki}|r_k\sin(\phi_k-\theta_k))^2\right)} d\theta dr$$

The density of $\zeta$ may be found by differentiating the above expression with respect to the $r_k$ and setting the result to $\zeta$ for all $r_k$:

$$f(\zeta) = \sum_{k=1}^{n} \frac{\partial P[\zeta_{max} \leq \zeta]}{\partial r_k} r_k = \zeta \quad (31)$$

The resulting expression in equation (31) may not be simplified in any readily useful way. A density of the above may exist as continuous and the performance measure of minimizing $E[\zeta_{max}; A]$ may be found as the $$\int_{0}^{\infty} \zeta f(\zeta) d\zeta.$$

In one embodiment, for matrices generated from constellations such as QAM, QPSK, etc., the maximum may be easier to compute because all possible constellation values may be known.

In an additional embodiment, $E[\zeta_{max}; A]$ might also be evaluated via Monte-Carlo methods; that is, from a sufficiently large number of random trials for a given matrix A, compute the average value of $E[\zeta_{max}; A]$ and invoke Chebyshev's inequality.

The performance measure $\vartheta(A) = E[\zeta_{max}; A]$ may be found or estimated sufficiently well; from which an estimate $\nabla \vartheta(A)$ may be determined, (with the gradient understood to be taken on the Stiefel manifold) and determine numerically an A for which $-\epsilon < \nabla \vartheta(A) < \epsilon$. In one embodiment, the above mentioned procedures may be developed based on algorithms for optimization constrained to the Stiefel manifold.

Figure 12:
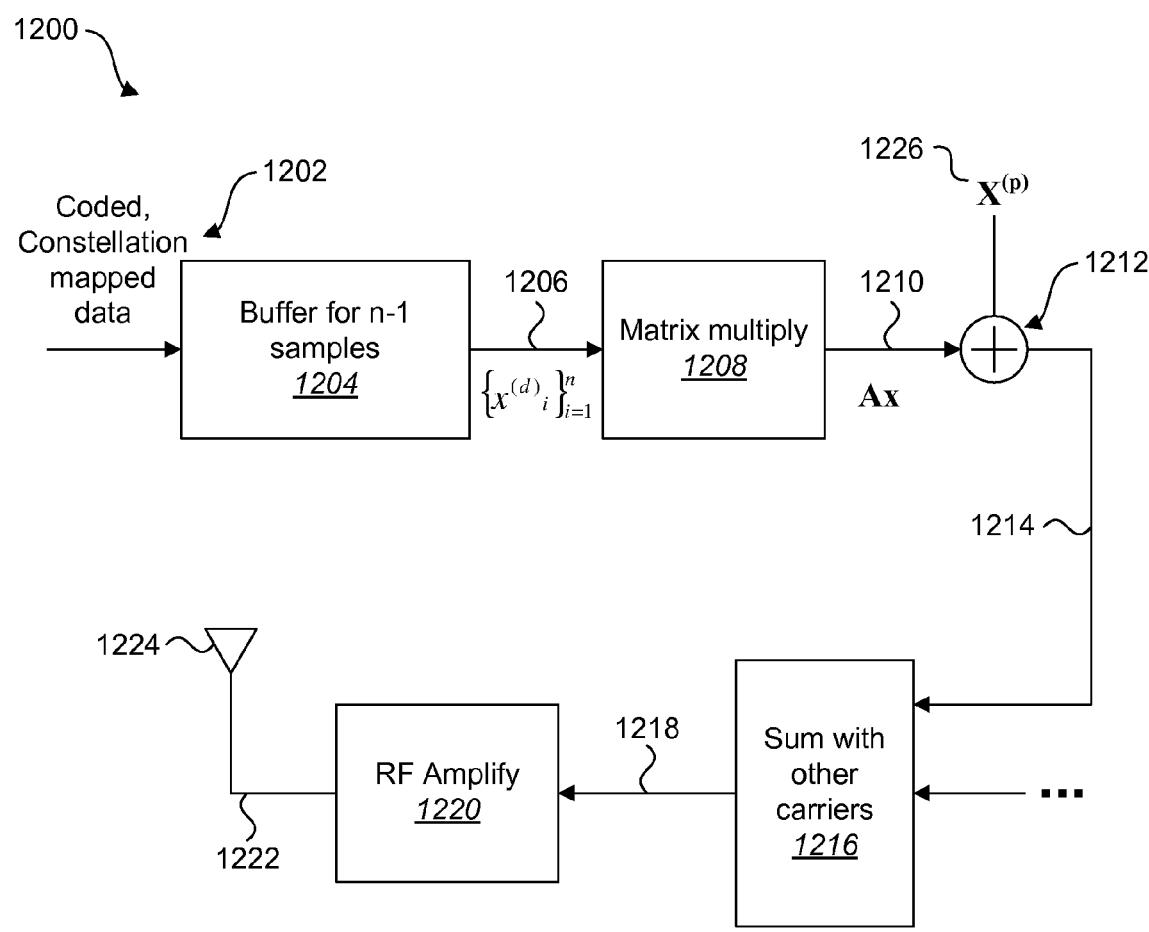
FIG. 12 is a block diagram illustrating an embodiment of a transmitter for a single carrier.

FIG. 12 is a block diagram illustrating an embodiment of a single carrier, in the form of a transmitter 1200, for a single sub-carrier. The above described process may be completed for each sub-carrier in a multiple sub-carrier system, and then the resulting signal may be transmitted. In one embodiment, the above described process may be executed along with any tone reservation scheme in order to minimize the PAPR.

The transmitter 1200 includes a coded, constellation mapped data signal 1202. A buffer 1204 may be applied to the mapped data signal 1202. After the buffer 1204 has been applied, the resultant signal 1206 may be represented as $\{x^{(d)}$ i$\}^n_{i=1}$. In one embodiment, the buffer 1204 may buffer the data signal 1202 for n-1 samples. The resultant signal 1206 may be multiplied by a matrix 1208. The matrix may include the form Ax. A signal product 1210 may then be summed 1212 together with the reference (or pilot) signal 1226. A combined signal 1214 may then be summed with signals of other sub-carriers 1216. A processed signal 1218 may be amplified by an RF amplifier 1220. A final signal 1222 may then be transmitted to a receiver by an antenna 1224. In one embodiment, the transmitter 1200 includes a single antenna 1224. In an additional embodiment, the transmitter 1200 includes multiple antennas.

Figure 13:
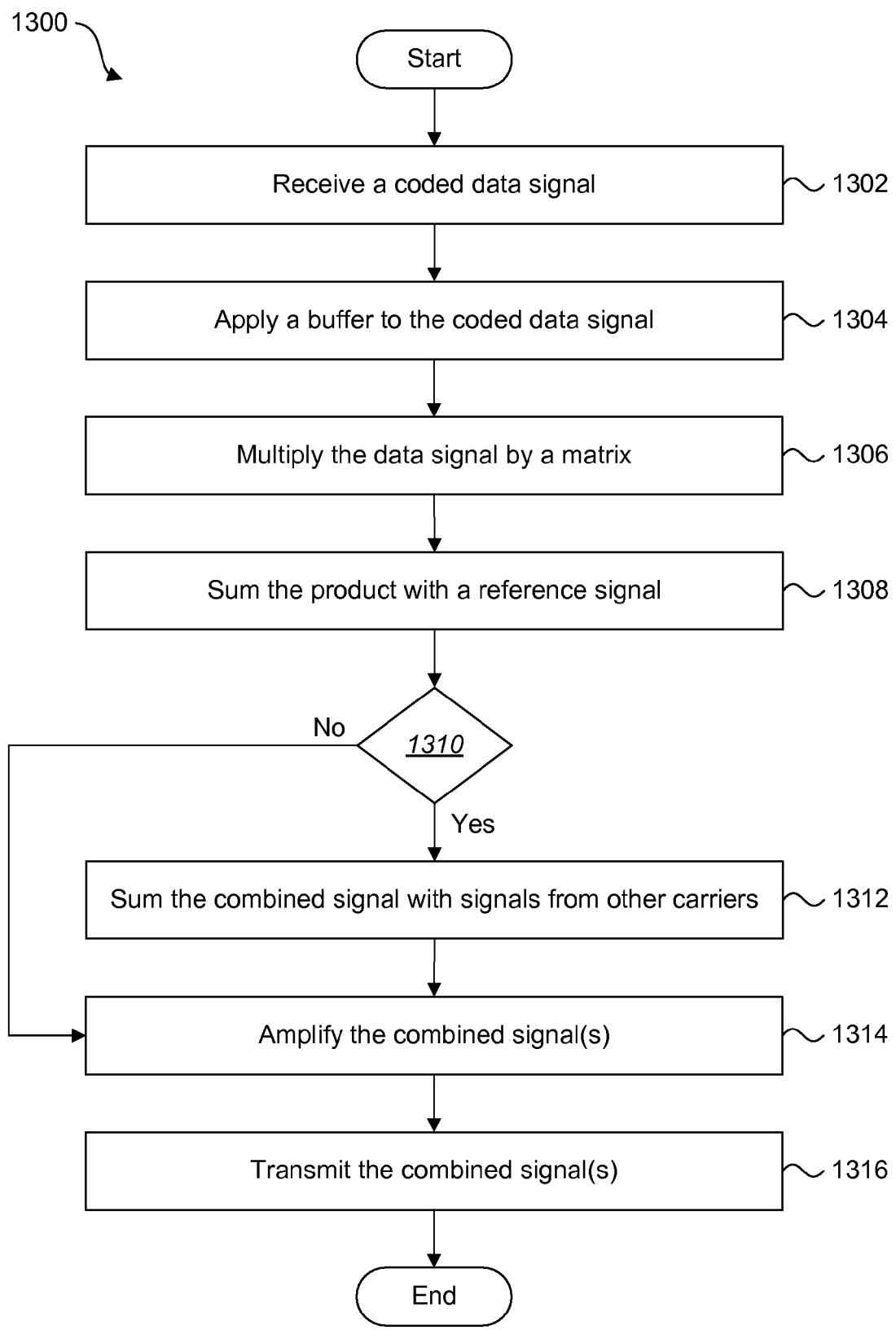
FIG. 13 is a flow diagram illustrating one embodiment of a method for transmitting an optimum format of a reference signal to a receiver.

FIG. 13 is a flow diagram illustrating one embodiment of a method 1300 for transmitting the optimum format of a reference signal to a receiver. The method 1300 may be implemented by the features of the block diagram illustrated in FIG. 12. The method 1300 starts and the transmitter 1200 may receive 1302 a coded data signal. A buffer may be applied 1304 to the coded data signal. The data signal may then be multiplied 1306 by a matrix. In one embodiment, the matrix is the optimum matrix value as described above. The method 1300 continues and the product from the multiplication 1306 may be summed 1308 with a reference signal.

The method 1300 continues and determines 1310 if there are additional sub-carriers, such as in a multiple sub-carrier system. If there are no additional sub-carriers, the method 1300 proceeds and amplifies 1314 the combined reference and data signal. If the method 1300 determines 1310 that there are additional sub-carriers, the method 1300 sums 1312 the combined signal with signals from the other sub-carriers. The method 1300 proceeds to amplify 1314 the signals and transmits 1316 the signals to a receiver.

Figure 14:
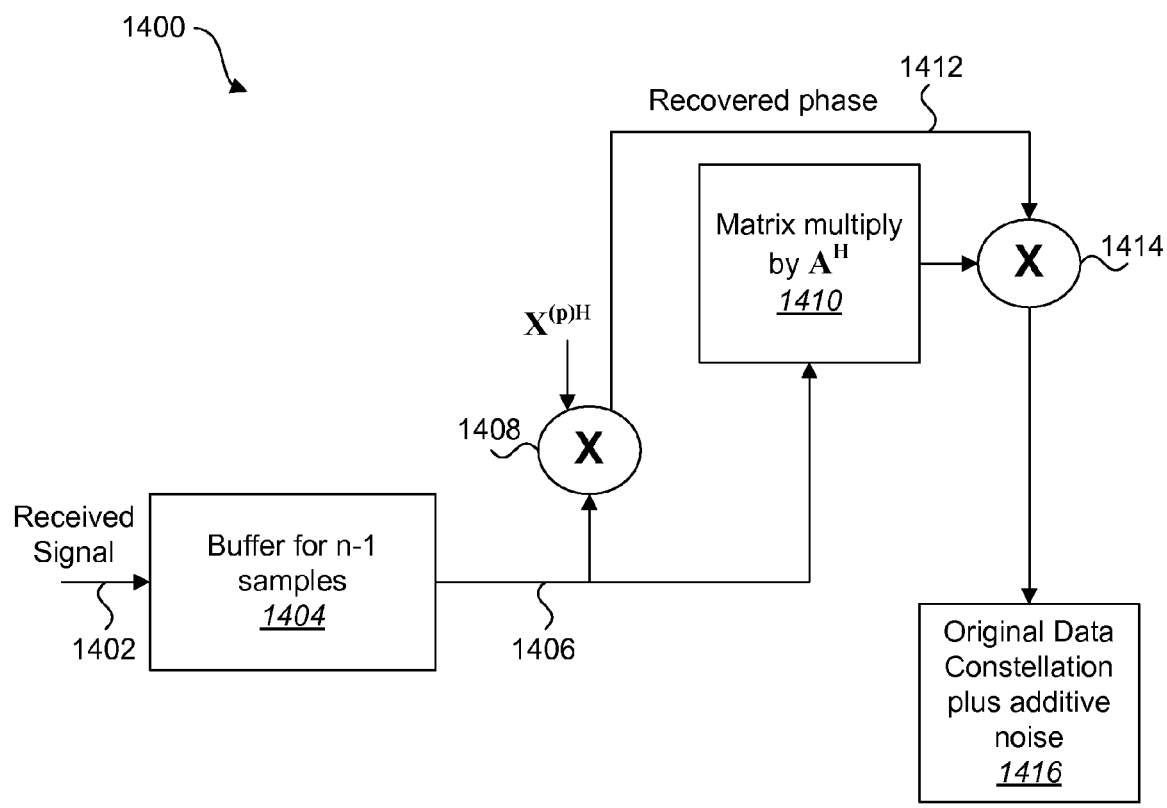
FIG. 14 is a block diagram illustrating an additional embodiment of a receiver.

FIG. 14 is a block diagram illustrating an additional embodiment of a receiver 1400 which may server to reproduce the reference (or pilot) and data signal. The receiver 1400 may receive a signal 1402 from the transmitter and apply a buffer 1404 to the received signal 1402. In one embodiment, the buffer 1404 is applied for n-1 samples. The receiver 1400 multiplies the buffered signal 1406 by a matrix $X^{(p)}$ 1408 (the minimum mean square receiver for the reference signal's pseudo-inverse terms not including $X^{(p)}$ as an identity matrix). The original data constellation may be retrieved by multiplying the buffered data signal 1406 by the matrix $A^H$ 1410.

Multiplying the reference signal by the matrix $X^{(p)}$ 1408 may recover the phase 1412 of the reference signal. After multiplication by the matrices $X^{(p)}$ 1408 and $A^H$ 1410, the product of the matrix $A^H$ multiplication is then multiplied 1414 with the recovered phase 1412 and the original data signal may be decoded. Decoding the data signal may retrieve the original data constellation 1416 plus a measure of additive noise.

Figure 15:
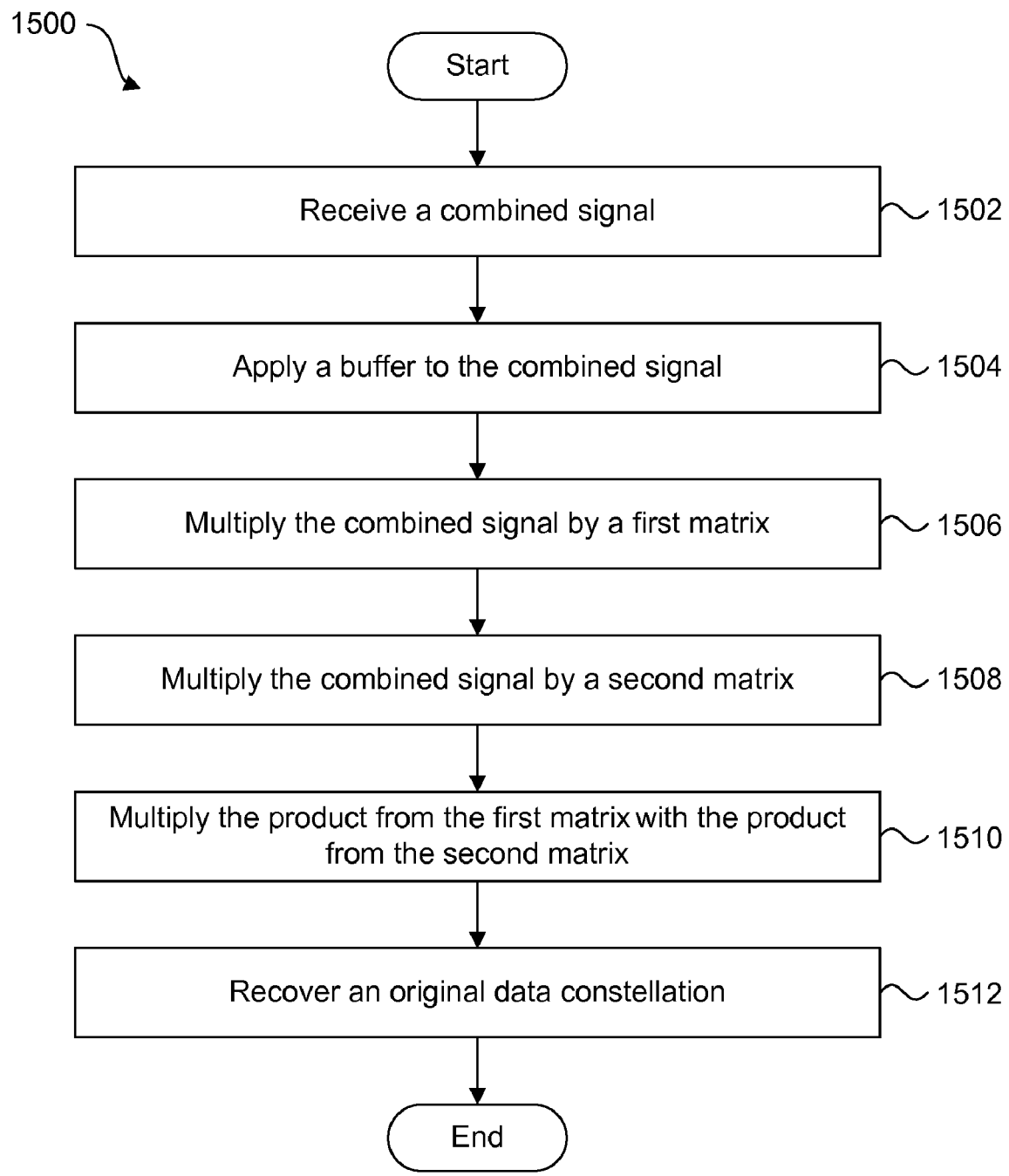
FIG. 15 is a flow diagram illustrating one embodiment of a method for recovering an original data constellation signal combined with a reference signal.

FIG. 15 is a flow diagram illustrating one embodiment of a method 1500 for recovering an original data constellation signal which has been combined with a reference signal. The method 1500 may be implemented by the receiver 1400 as explained in FIG. 14.

The method 1500 starts and the receiver 1400 receives 1502 a combined coded signal. The receiver 1400 may apply 1504 a buffer to the combined signal. The method 1500 may continue and multiply 1506 the combined signal by a first matrix. In one embodiment, the first matrix may include the matrix $X^{(p)}$. The method 1500 may continue and multiply 1508 the combined signal by a second matrix. In one embodiment, the second matrix may include the matrix $A^H$. The product from the first matrix multiplication may then be multiplied 1510 with the product of the second matrix multiplication. The method 1500 may then recover 1512 the original data constellation from the final multiplication product.

The transmitter 1200 and receiver 1400 may represent a single antenna system. As previously explained, if a single antenna is implemented, the reference signal may be referred to as a pilot signal. For a MIMO system, more columns of an analogous U matrix may be used which correspond to reference signals. In one embodiment, the data $X^{(d)}$ may be represented as an $(n-m_T)$ by $m_T$ dimensional matrix, where the rows represent instants in time and the columns represent the number of transmitted antennas. The transmitted signal may then be given by:

$$Z = \left[ \sqrt{\frac{\rho_p}{m_T}} X^{(p)} + \sqrt{\frac{\rho_d}{m_T}} AX^{(d)} \right],$$

where the matrix A may be an n by $(n-m_T)$ matrix, whose columns are orthogonal to the $n \times m_T$ matrix of reference signals, and whose PAPR is optimized in a similar manner as described above for the single antenna case. Each column of Z may be transmitted over each antenna, and the demodulation procedure may be carried out after the multiplications by the matrices $A^H$ and $X^{(p)H}$ are performed. The transmitter 1200 and the receiver 1400 may be the same as in FIGS. 12 and 14 for each additional antenna. In one embodiment, each column of the matrix $X^{(p)}$ is orthogonal.

Figure 16:
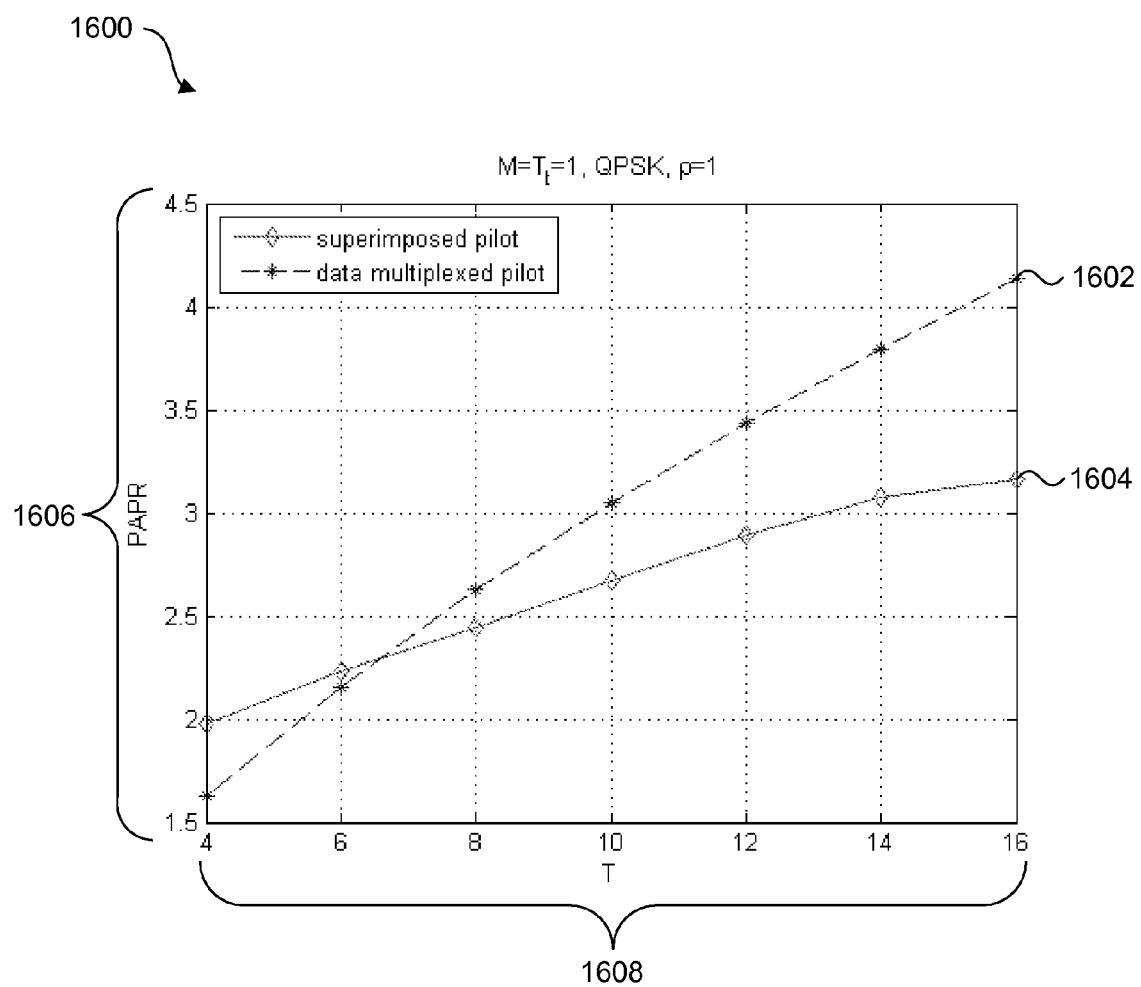
FIG. 16 is a chart illustrating one embodiment of results regarding the PAPR for a single antenna system by considering a real pilot signal with QPSK signals.
Figure 17:
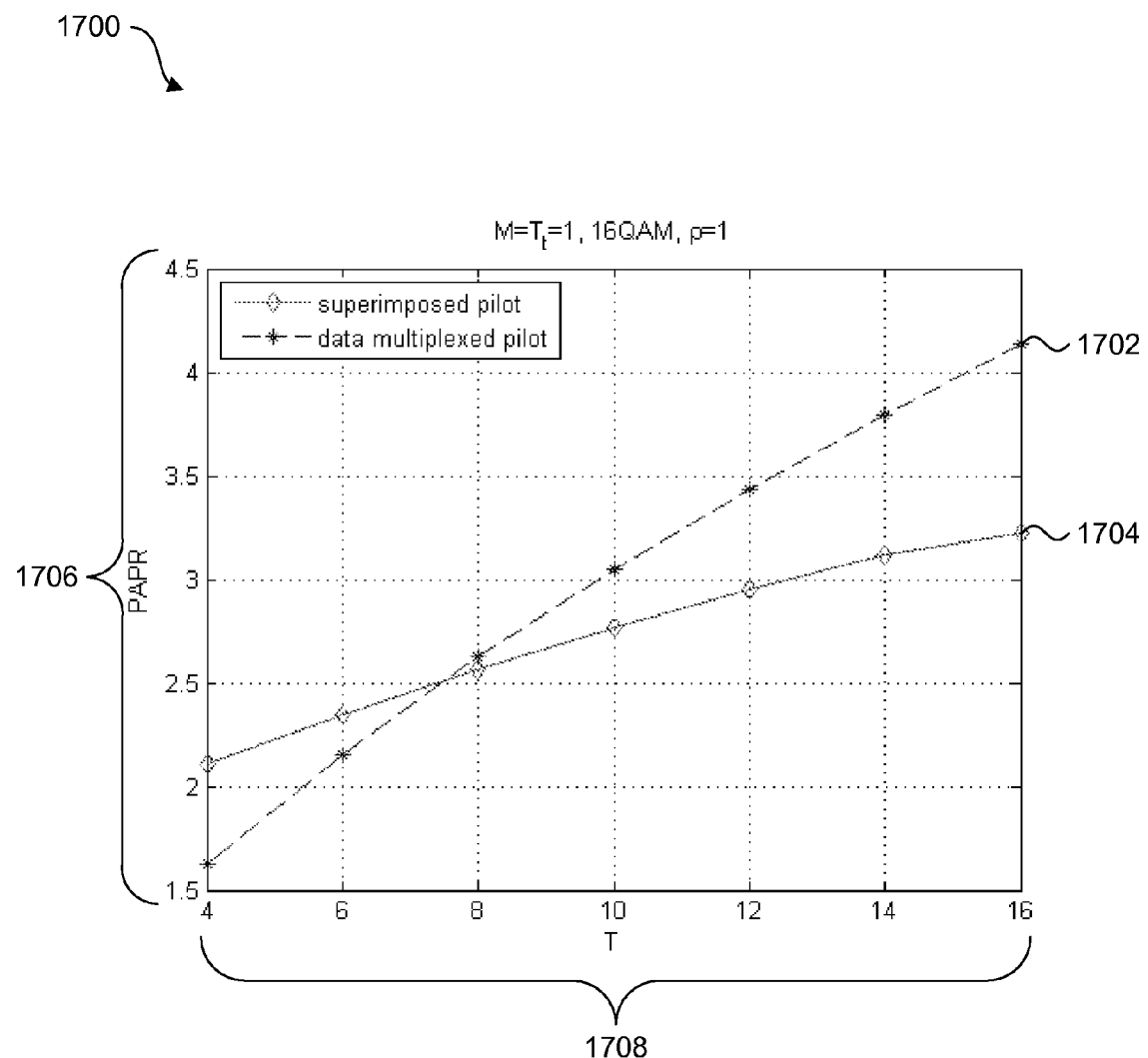
FIG. 17 is a chart illustrating one embodiment of results regarding the PAPR for a single antenna system by considering a real pilot signal with 16-QAM signals.

FIGS. 16 and 17 are charts illustrating one embodiment of results 1600, 1700 regarding the PAPR for a single antenna system. A superimposed pilot 1604, 1704 is compared with a TDMA pilot 1602, 1702. The results 1600, 1700 were obtained by considering a real pilot signal with QPSK and 16-QAM signals respectively. The performance of the receivers may be identical in terms of capacity and symbol error for a given additive noise, and thus represent the maximum throughput that may be achieved for a given allocation of pilot and data power, yet is reduced in PAPR 1606, 1706. The results 1600, 1700 indicate that for the (non-optimized) choices of the matrix A, improvement in PAPR may be seen if the channel is roughly constant for more than eight symbols 1608, 1708.

Figure 18:
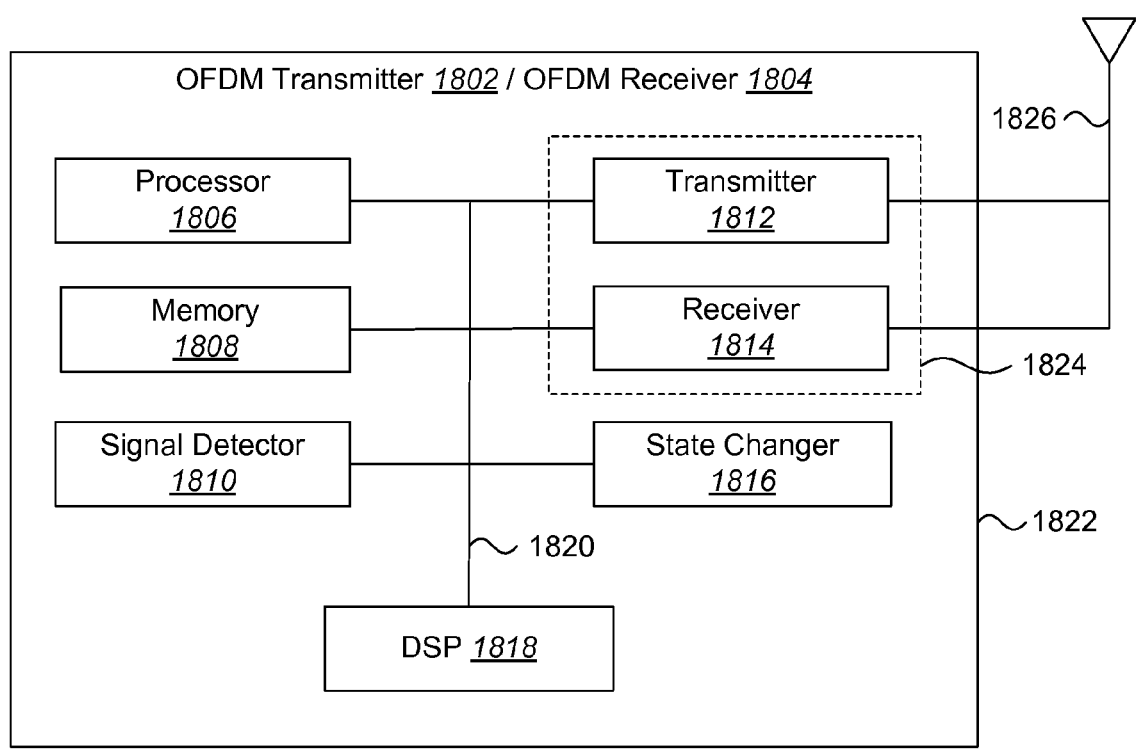
FIG. 18 illustrates various components that may be utilized in an OFDM transmitter and/or an OFDM receiver.

FIG. 18 illustrates various components that may be utilized in an OFDM transmitter 1802 and/or an OFDM receiver 1804. The OFDM transmitter 1802 and/or OFDM receiver 1804 includes a processor 1806 which controls operation of the OFDM transmitter 1802 and/or OFDM receiver 1804. The processor 1806 may also be referred to as a CPU. Memory 1808, which may include both read-only memory (ROM) and random access memory (RAM), provides instructions and data to the processor 1806. A portion of the memory 1808 may also include non-volatile random access memory (NVRAM).

The OFDM transmitter 1802 and/or OFDM receiver 1804 may also include a housing 1822 that contains a transmitter 1812 and a receiver 1814 to allow transmission and reception of data. The transmitter 1812 and receiver 1814 may be combined into a transceiver 1824. An antenna 1826 is attached to the housing 1822 and electrically coupled to the transceiver 1812. Additional antennas (not shown) may also be used.

The OFDM transmitter 1802 and/or OFDM receiver 1804 may also include a signal detector 1810 used to detect and quantify the level of signals received by the transceiver 1824. The signal detector 1810 detects such signals as total energy, pilot energy per pseudonoise (PN) chips, power spectral density, and other signals.

A state changer 1816 controls the state of the OFDM transmitter 1802 and/or OFDM receiver 1804 based on a current state and additional signals received by the transceiver 1824 and detected by the signal detector 1810. The OFDM transmitter 1802 and/or OFDM receiver 1804 may be capable of operating in any one of a number of states.

The various components of the OFDM transmitter 1802 and/or OFDM receiver 1804 are coupled together by a bus system 1820 which may include a power bus, a control signal bus, and a status signal bus in addition to a data bus. However, for the sake of clarity, the various buses are illustrated in FIG. 18 as the bus system 1820. The OFDM transmitter 1802 and/or OFDM receiver 1804 may also include a digital signal processor (DSP) 1818 for use in processing signals. One skilled in the art will appreciate that the OFDM transmitter 1802 and/or OFDM receiver 1804 illustrated in FIG. 18 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for optimizing a transmission format of a reference signal, the method comprising:
   providing a first matrix;
   computing a second matrix from the first matrix;
   defining a derivative of a function of the second matrix;
   obtaining iterates of the function of the second matrix;
   determining, by a processor, the function of the second matrix using the derivative of the function of the second matrix and the iterates;
   calculating, by the processor, an optimum value of the first matrix using the iterates of the function of the second matrix, wherein the optimum value of the first matrix minimizes the peak-to-average power ratio (PAPR) of a transmit signal; and
   transforming a plurality of data symbols to be sent contemporaneously with one or more reference signals using the optimum value of the first matrix.

2. The method of claim 1, further comprising transmitting the plurality of data symbols and the one or more reference signals with a single antenna.

3. The method of claim 1, further comprising transmitting the plurality of data symbols and the one or more reference signals with a multiple-input multiple-output antenna system.

4. The method of claim 1, further comprising implementing Gaussian random matrices to represent signal constellations.

5. The method of claim 1, further comprising implementing random M-ary phase shift keyed (M-PSK) modulation to transmit the data, wherein the data and a superposed pilot signal are optimized based on the M-PSK modulation format.

6. The method of claim 1, further comprising implementing random M-ary quadrature amplitude modulation (M-QAM) modulation to transmit the data, wherein the data and a superposed pilot signal are optimized based on the M-QAM modulation format.

7. The method of claim 1, further comprising implementing Gram-Schmidt procedures to format a signal to be orthogonal to the data wherein the signal is superposed on the data.

8. The method of claim 1, further comprising obtaining the optimum value of the first matrix by implementing steepest decent methods restricted to a Stiefel manifold determined by the reference signals.

9. A method for optimizing a transmission format of a reference signal, the method comprising:
   providing a first matrix;
   computing a second matrix from the first matrix;
   defining a derivative of a function of the second matrix;
   obtaining iterates of the function of the second matrix;
   determining, by a processor, the function of the second matrix using the derivative of the function of the second matrix and the iterates;
   calculating, by the processor, an optimum value of the first matrix using the iterates of the function of the second matrix; and
   transmitting data, by a transmitter, in the form rpmT X(p)+ rdmT AX(d) wherein X(d) is a column vector which is mapped by a matrix A into a column vector of n rows, wherein n represents coherence time of the flat fading channel, wherein m represents the number of antennas, and wherein X(p) is a reference signal composed of the sum of m orthogonal reference signals.

10. The method of claim 9, wherein the matrix A has a singular value decomposition of the form $A=U\Sigma V^H$, wherein a matrix $U\in \mathbb{C}^{n\times n}$, wherein $\Sigma \in \mathbb{C}^{n\times(n-1)}$, wherein a matrix $V\in \mathbb{C}^{(n-1)\times(n-1)}$, wherein U and V are unitary matrices, and wherein $\Sigma$ is a matrix of singular values on the diagonal.

11. The method of claim 10, wherein the matrix U is an orthonormal basis which contains X(p) in the last row and column of the matrix U.

12. The method of claim 9, wherein the matrix A is an isometry and wherein $\Sigma$ has the form of all ones on the diagonal, except for the last row, wherein the last row is zero.

13. A transmitter that is configured to implement a method for optimizing a transmission format of a reference signal, the transmitter comprising:
   a processor;
   memory in electronic communication with the processor;
   instructions stored in the memory. the instructions being executable to:
      provide a first matrix;
      compute a second matrix from the first matrix;
      define a derivative of a function of the second matrix;
      obtain iterates of the function of the second matrix;
      determine the function of the second matrix using the derivative of the function of the second matrix and the iterates;
      calculate an optimum value of the first matrix using the iterates of the function of the second matrix, wherein the optimum value of the first matrix minimizes the peak-to-average power ratio (PAPR) of a transmit signal; and
      transforming a plurality of data symbols to he sent contemporaneously with one or more reference signals using the optimum value of the first matrix.

14. The transmitter of claim 13, wherein the instructions are further executable to transmit the plurality of data symbols and the one or more reference signals with a single antenna.

15. The transmitter of claim 13, wherein the instructions are further executable to transmit the plurality of data symbols and the one or more reference signals with a multiple-input multiple-output antenna system.

* * * * *

UNITED STATES PATENT AND TRADEMARK OFFICE
CERTIFICATE OF CORRECTION

PATENT NO. : 7,746,766 B2
APPLICATION NO. : 11/534197
DATED : June 29, 2010
INVENTOR(S) : John M. Kowalski et al.

It is certified that error appears in the above-identified patent and that said Letters Patent is hereby corrected as shown below:

In column 10, lines 37-38 please delete "$F=(X^{(p)})^H n-(m_T-1)...n, 1...m_T$" and replace it with -- $F = (X^{(p)})^H{}_{n-(m_T-1)...n, 1...m_T}$ --.

In column 10, line 38 please delete "$G=(X^{(p)})^H 1...(n-m_T), 1...m_T$" and replace it with -- $G = (X^{(p)})^H{}_{1...(n-m_T), 1...m_T}$ --.

In column 10, line 39 please delete "$VF=X1...m_T, 1...(n-m_T)^{(d)} G$" and replace it with -- $VF = X_{1...m_T, 1...(n-m_T)}{}^{(d)} G$ --.

In column 10, line 40 please delete "$V=-X1...m_T, 1...(n-m_T)^{(d)} GF^{-1}$" and replace it with -- $V = -X_{1...m_T, 1...(n-m_T)}{}^{(d)} G F^{-1}$ --.

In column 10, line 45 please delete "$F=(X^{(p)})^H n-(m_T-1)...n, 1...m_T$" and replace it with -- $F = (X^{(p)})^H{}_{n-(m_T-1)...n, 1...m_T}$ --.

In column 10, lines 57-58 please delete "$X^{(p)} n-(m_T-1)...n, 1...m_T$" and replace it with -- $X^{(p)}{}_{n-(m_T-1)...n, 1...m_T}$ --.

In column 10, line 59 please delete "$F^{-1}=C 1 1...m_T, 1...m_T$, where $1 1...m_T, 1...m$" and replace it with -- $F^{-1} = C 1_{1...m_T, 1...m_T}$, where $1_{1...m_T, 1...m}$ --.

In column 10, line 63 please delete "$F=I 1...m_T, 1...m_T$" and replace it with -- $F = I_{1...m_T, 1...m_T}$ --.

In column 10, lines 63-64 please delete "$G=0 1...(n-m_T), 1...m_T$" and replace it with -- $G = 0_{1...(n-m_T), 1...m_T}$ --.

In column 11, line 9 please delete "$F=(X^{(p)})^H n-(m_T-1)...n, 1...m_T$" and replace it with -- $F = (X^{(p)})^H{}_{n-(m_T-1)...n, 1...m_T}$ --.

Signed and Sealed this
Eighth Day of March, 2011

David J. Kappos
*Director of the United States Patent and Trademark Office*

CERTIFICATE OF CORRECTION (continued)
U.S. Pat. No. 7,746,766 B2

In column 11, lines 45-46 please delete "$[x^{(d)}(t_1)x^{(d)}(t_2)\ldots x^{(d)}(t(n-m_T))]$" and replace it with -- $[x^{(d)}(t_1)\ x^{(d)}(t_2)\ldots\ x^{(d)}(t_{(n-m_T)})]$ --.

In column 12, line 10 please delete "$\| x_k^{(p)}(t(n-m_T+1))\ldots x_k^{(p)}(t_n)\|_2 = 1 - \alpha$" and replace it with -- $\| x_k^{(p)}(t_{(n-m_T+1)})\ldots x_k^{(p)}(t_n) \|_2 = 1-\alpha$ --.

In column 12, line 17 please delete "$\|x_k^{(d)}(t_1)\ldots x_k^{(d)}(t(n-m_T)\|_2 = 1$" and replace it with -- $\|x_k^{(d)}(t_1)\ldots x_k^{(d)}(t_{(n-m_T)})\|_2 = 1$ --.

In column 12, line 45 please delete "$[z_i(t_1)\ldots z_i(t(n-m_T))]$" and replace it with -- $[\ z_i(t_1)\ldots z_i(t_{(n-m_T)})\ ]$ --.

In column 12, lines 57-58 please delete "$Z^{(d)} = X1\ldots m_T, 1\ldots(n-m_T)^{(d)} - \beta\Gamma X1\ldots m_T, 1\ldots(n-m_T)^{(p)}$" and replace it with -- $Z^{(d)} = X_{1\ldots m_T, 1\ldots(n-m_T)}^{(d)} - \beta\Gamma X_{1\ldots m_T, 1\ldots(n-m_T)}^{(p)}$ --.

In column 13, line 10 please delete "$X1\ldots m_T, 1\ldots(n-m_T)^{(p)}$" and replace it with -- $X_{1\ldots m_T, 1\ldots(n-m_T)}^{(p)}$ --.

In column 13, line 11 please delete "$V = -X1\ldots m_T, 1\ldots(n-m_T)^{(d)} GF^{-1}$" and replace it with -- $V = -X_{1\ldots m_T, 1\ldots(n-m_T)}^{(d)}\ G\ F^{-1}$ --.

In column 13, line 23 please delete "$G = (X^{(p)})^H 1\ldots(n-m_T), 1\ldots m_T$" and replace it with -- $G = (X^{(p)})^H_{\ 1\ldots(n-m_T), 1\ldots m_T}$ --.

In column 13, lines 23-24 please delete "$F = (X^{(p)})^H n-(m_T-1)\ldots n, 1\ldots m_T$" and replace it with -- $F = (X^{(p)})^H_{\ n-(m_T-1)\ldots n, 1\ldots m_T}$ --.

In column 13, line 56 please delete "$X1\ldots m_T, 1\ldots(n-m_T)^{(d)}(X^{(p)})^H 1\ldots(n-m_T), 1\ldots m_T = \alpha\Gamma$" and replace it with -- $X_{1\ldots m_T, 1\ldots(n-m_T)}^{(d)}(X^{(p)})^H_{\ 1\ldots(n-m_T), 1\ldots m_T} = \alpha\Gamma$ --.

In column 13, lines 66-67 please delete "$X1\ldots m_T, 1\ldots(n-m_T)^{(d)}$" and replace it with -- $X_{1\ldots m_T, 1\ldots(n-m_T)}^{(d)}$ --.

In column 14, line 5 please delete "$X1\ldots m_T, 1\ldots(n-m_T)^{(d)}$" and replace it with -- $X_{1\ldots m_T, 1\ldots(n-m_T)}^{(d)}$ --.

In column 14, lines 47-48 please delete "$U \in \mathbb{C}n \times n, \Sigma \in \mathbb{C}n \times (n-1)$, and $V \in \mathbb{C}(n-1) \times (n-1)$" and replace it with -- $U \in \mathcal{C}^{n \times n}, \Sigma \in \mathcal{C}^{n \times (n-1)}$, and $V \in \mathcal{C}^{(n-1) \times (n-1)}$ --.

In column 17, line 26 please delete "$\mathcal{P}A)$" and replace it with -- $\mathcal{P}(A)$ --.

In column 17, line 27 please delete "$\mathcal{P}A)$" and replace it with -- $\mathcal{P}(A)$ --.

In column 17, line 29 please delete "$\mathcal{P}A)$" and replace it with -- $\mathcal{P}(A)$ --.

CERTIFICATE OF CORRECTION (continued)
U.S. Pat. No. 7,746,766 B2

In column 17, line 34 please delete "$(\mathcal{P}A) = E\left(\left\|\sqrt{\frac{\rho_p}{m_T}} X^{(p)} + \sqrt{\frac{\rho_d}{m_T}} Z^{(d)}\right\|_\infty\right)^2$"

and replace it with -- $\mathcal{P}(A) = E\left(\left\|\sqrt{\frac{\rho_p}{m_T}} X^{(p)} + \sqrt{\frac{\rho_d}{m_T}} Z^{(d)}\right\|_\infty\right)^2$ --.

In column 18, line 1 please delete "$\mathcal{P}A)$" and replace it with -- $\mathcal{P}(A)$ --.

In column 18, line 3 please delete "$\mathcal{P}A+\delta A)$" and replace it with -- $\mathcal{P}(A+\delta A)$ --.

In column 18, line 4 please delete "$\mathcal{P}A)$" and replace it with -- $\mathcal{P}(A)$ --.

In column 19, line 4 please delete equation (29) and replace it with $$P[\zeta_{max} \leq \zeta] = \int_{r=0}^{\zeta} \int_{\theta=0}^{2\pi} \frac{C(A)}{\pi^{n-1}} r\, e^{-\left(\sum_{i=1}^{n-1}\left(\sum_{k=1}^{n} a_{ki}^R r_k \cos\theta_k + a_{ki}^I r_k \sin\theta_k\right)^2 + \left(\sum_{k=1}^{n} a_{ki}^I r_k \cos\theta_k - a_{ki}^R r_k \sin\theta_k\right)^2\right)} d\theta\, dr$$

--.

In column 19, line 27 please delete equation (31) and replace it with $$f(\zeta) = \sum_{k=1}^{n} \left.\frac{\partial P[\zeta_{max} \leq \zeta]}{\partial r_k}\right|_{r_k = \zeta}$$

--.

In column 24, line 52 please delete "to he sent" and replace it with --to be sent--.